(12) United States Patent
Kim et al.

(10) Patent No.: US 9,293,936 B2
(45) Date of Patent: Mar. 22, 2016

(54) POWER RELAY ASSEMBLY DRIVING APPARATUS AND DRIVING METHOD THEREOF

(75) Inventors: Ho Kyung Kim, Yongin (KR); Sang Ryong Lee, Yongin (KR)

(73) Assignee: YURA CORPORATION CO., LTD., Cheongwon-Gun, Chungcheongbuk-Do (KR)

( * ) Notice: Subject to any disclaimer, the term of this patent is extended or adjusted under 35 U.S.C. 154(b) by 191 days.

(21) Appl. No.: 14/126,185

(22) PCT Filed: Jun. 14, 2012

(86) PCT No.: PCT/KR2012/004700
§ 371 (c)(1),
(2), (4) Date: Dec. 13, 2013

(87) PCT Pub. No.: WO2012/173408
PCT Pub. Date: Dec. 20, 2012

(65) Prior Publication Data
US 2014/0125290 A1 May 8, 2014

(30) Foreign Application Priority Data

Jun. 17, 2011 (KR) ........................ 10-2011-0059113
Feb. 10, 2012 (KR) ........................ 10-2012-0013823
May 29, 2012 (KR) ........................ 10-2012-0056502
Jun. 4, 2012 (KR) ........................ 10-2012-0060004

(51) Int. Cl.
*H02J 7/00* (2006.01)
*B60L 3/00* (2006.01)
*B60L 3/04* (2006.01)
*B60L 11/18* (2006.01)

(52) U.S. Cl.
CPC ............. *H02J 7/0065* (2013.01); *B60L 3/0023* (2013.01); *B60L 3/04* (2013.01); *B60L 11/1803* (2013.01); *H02J 7/007* (2013.01); *H02J 7/0029* (2013.01)

(58) Field of Classification Search
CPC ....... H02J 7/007; H02J 7/0029; H02J 7/0065; B60L 11/1803; B60L 3/04; B60L 3/0023

USPC .................................. 320/135; 307/9.1, 10.1
See application file for complete search history.

(56) References Cited

U.S. PATENT DOCUMENTS 5,015,921 A * 5/1991 Carlson .................. H05B 39/02
315/208
RE35,643 E * 10/1997 Gali ...................... H01M 10/44
320/100

(Continued)

FOREIGN PATENT DOCUMENTS

EP 2 415 628 2/2012
JP 2001-327001 11/2001

(Continued)

OTHER PUBLICATIONS

International Search Report for International Application No. PCT/KR2012/004700 dated Dec. 6, 2012.

(Continued)

*Primary Examiner* — M'Baye Diao
(74) *Attorney, Agent, or Firm* — Kile Park Reed & Houtteman PLLC

(57) ABSTRACT

A power relay assembly driving apparatus includes a relay unit which switches a connection between a terminal of a battery unit and a terminal of an inverter unit, a switching unit connected in parallel to the relay unit between the terminal of the battery unit and the terminal of the inverter unit, and a battery management system (BMS) which controls the switching unit upon a power cutoff of the battery unit in order to form an equipotential between the relay unit and the terminal of the inverter unit, and controls the relay unit in order to electrically separate the terminal of the battery unit and the terminal of the inverter unit from each other.

20 Claims, 15 Drawing Sheets

(56) References Cited

U.S. PATENT DOCUMENTS

| | | | | |
|---|---|---|---|---|
| 6,476,571 | B1* | 11/2002 | Sasaki | B60K 6/26 180/65.1 |
| 7,439,697 | B2* | 10/2008 | Miyazaki | B60L 11/123 310/112 |
| 2011/0169448 | A1* | 7/2011 | Ichikawa | B60K 6/445 320/109 |

FOREIGN PATENT DOCUMENTS

| | | |
|---|---|---|
| JP | 2005-261192 | 9/2005 |
| JP | 2006-155915 | 6/2006 |
| JP | 2007-200817 | 8/2007 |
| JP | 2008-312396 | 12/2008 |
| JP | 2010-518804 | 5/2010 |
| JP | 2010-193558 | 9/2010 |
| KR | 10-2005-0045597 | 5/2005 |
| KR | 10-2010-0062702 | 6/2010 |
| WO | 2008/098230 | 8/2008 |

OTHER PUBLICATIONS

Supplementary European search report; Extended European Search Report for European Application No. EP12800203.7, Dated May 26, 2015.

* cited by examiner

| Status | FIRST RELAY UNIT | FIRST SWITCHING UNIT | SECOND RELAY UNIT | SECOND SWITCHING UNIT |
|---|---|---|---|---|
| ALL OFF | OFF | OFF | OFF | OFF |
| MAIN MINUS ON | ON | OFF | OFF | OFF |
| PRE-CHARGING | ON | ON | OFF | OFF |
| NORMAL-CHARING (MAIN PLUS ON) | ON | ON | ON | OFF |
| PRE-CHARGE END | ON | OFF | ON | OFF |
| DISCONNECT START | ON | OFF | ON | ON |
| DISCONNECTING | ON | OFF | OFF | ON |

POWER RELAY ASSEMBLY DRIVING APPARATUS AND DRIVING METHOD THEREOF

TECHNICAL FIELD

The present invention relates to a power relay assembly driving apparatus and a driving method thereof.

BACKGROUND ART

Generally, a power relay assembly is a power cutoff apparatus configured to connect and disconnect a power connected to a motor from a battery of an electrical vehicle and a hybrid vehicle using a power control unit (PCU), which is a core component serving as a main gate for supplying a power. Further, the power relay assembly serves as a safety device for completely cutting off power supply in the occurrence of a system error or in a state of repair (maintenance), etc., thereby protecting an electric vehicle/hybrid vehicle.

Such power relay assembly includes a high-voltage relay such as a pre-charging relay (450V, 10 A or more) and a main relay (450V, 100~150A or more), a high voltage/large current bus bar for wire connection with a battery/inverter, a terminal, etc. Among such components, a core component is a high voltage relay serving to connect or disconnect a high voltage/large current. A mechanical relay structure, where special gas such as $H_2$ has been injected in a sealed manner for prevention of spark which can occur at a contact of the relay, has been mainly used as the high voltage relay.

However, such high voltage relay increases the entire weight of the power relay assembly, because it is heavy due to its special gas.

Further, the high voltage relay has a complicated mechanical structure, and has expensive components because the material cost of the components is high. This may cause the cost of the power relay assembly to be increased.

DISCLOSURE OF THE INVENTION

Therefore, an object of the present invention is to provide a power relay assembly driving apparatus capable of replacing an expensive special gas-charged relay used to prevent occurrence of an arc at a contact of a relay, by a cheap general relay, under control of a battery management system (BMS) or a main controller, and capable of enhancing fuel efficiency of a vehicle by having a reduced entire weight due to the general relay, and a driving method thereof.

Another object of the present invention is to provide a power relay assembly driving apparatus capable of preventing damage of a switching unit due to temperature increase, by controlling a current flow according to a temperature sensed by a protection unit, and a driving method thereof.

Another object of the present invention is to provide a power relay assembly driving apparatus capable of handling a case where a switching unit or a protection unit has broken down using a communication unit, and handling a case where an over-current flows using a current sensing unit, and capable of preventing contact fusion occurring at a contact of a relay when a short circuit has occurred, and a driving method thereof.

Another object of the present invention is to provide a power relay assembly driving apparatus capable of simplifying arrangement of wires by preventing wire increase due to addition of peripheral devices using a communication unit, and a driving method thereof.

Another object of the present invention is to provide a power relay assembly driving apparatus capable of minimizing an error resulting from mal-connection of complicated wires by easily controlling a main controller without the complicated wires using a communication unit, and a driving method thereof.

To achieve these and other advantages and in accordance with the purpose of the present invention, as embodied and broadly described herein, there is provided a power relay assembly driving apparatus, comprising: a first relay unit which switches a connection between a first terminal of a battery unit and a first terminal of an inverter unit having a capacitor; a second relay unit which switches a connection between a second terminal of the battery unit and a second terminal of the inverter unit; a first switching unit connected in parallel to the second relay unit between the second terminal of the battery unit and the second terminal of the inverter unit; a second switching unit connected in parallel to the second relay unit between the second terminal of the battery unit and the second terminal of the inverter unit; and a battery management system (BMS) which controls the first relay unit and the first switching unit in order to pre-charge the capacitor with the power of the battery unit, controls the second relay unit in order to normal-charge the capacitor with the power of the battery unit and then controls the first switching unit in order to end the pre-charging of the capacitor, controls the second switching unit upon a power cutoff of the battery unit in order to form an equipotential between the second relay unit and the second terminal of the inverter unit, and controls the second relay unit in order to electrically separate the second terminal of the battery unit and the second terminal of the inverter unit from each other.

According to another aspect of the present invention, there is provided a power relay assembly driving apparatus, comprising: a first relay unit which switches a connection between a first terminal of a battery unit and a first terminal of an inverter unit having a capacitor; a second relay unit which switches a connection between a second terminal of the battery unit and a second terminal of the inverter unit; a first switching unit and a second switching unit connected between a main controller connected to the second terminal of the battery unit and the second terminal of the inverter unit; and the main controller which controls the first relay unit and the first switching unit in order to pre-charge the capacitor with the power of the battery unit, controls the second relay unit in order to normal-charge the capacitor with the power of the battery unit and then controls the first switching unit in order to end the pre-charging of the capacitor, controls the second switching unit upon a power cutoff of the battery unit in order to form an equipotential between the second relay unit and the second terminal of the inverter unit, and controls the second relay unit in order to electrically separate the second terminal of the battery unit and the second terminal of the inverter unit from each other.

To achieve these and other advantages and in accordance with the purpose of the present invention, as embodied and broadly described herein, there is also provided a method for driving a power relay assembly driving apparatus, the method comprising: a first terminal connection step of controlling a first relay unit by a main controller in order to electrically-connect a first terminal of a battery unit to a first terminal of an inverter unit having a capacitor; a pre-charging step of controlling the first switching unit by the main controller after the first terminal connection step, in order to electrically-connect a second terminal of the battery unit with a second terminal of the inverter unit, thereby pre-charging the capacitor with a power of the battery unit; a normal-charging step of controlling a second relay unit by the main controller after the pre-charging step, in order to electrically-connect the second terminal of the battery unit, the second relay unit and the second terminal of the inverter unit with one another, thereby normal-charging the capacitor with the power of the battery unit; a pre-charge end step of controlling the first switching unit by the main controller during the normal-charging step, thereby electrically separating the second terminal of the battery unit and the second terminal of the inverter unit from each other; and a separation step of controlling a second switching unit by the main controller upon a power cutoff of the battery unit during the normal-charging step, in order to form an equipotential between the second relay unit and the second terminal of the inverter unit, and then controlling the second relay unit in order to electrically separate the second terminal of the battery unit and the second terminal of the inverter unit from each other.

Effects of the Present Invention

In the power relay assembly driving apparatus and the driving method thereof according to the present invention, an expensive special gas-charged relay used to prevent occurrence of an arc at a contact of a relay can be replaced by a cheap general relay under control of a battery management system or a main controller, and fuel efficiency of a vehicle can be enhanced by having a reduced entire weight due to the general relay.

Further, damage of the switching unit due to temperature increase can be prevented by controlling a current flow according to a temperature sensed by a protection unit.

Further, a case where the switching unit or a protection unit has broken down can be handled using a communication unit, and a case where an over-current flows can be handled using a current sensing unit, and contact fusion occurring at a contact of a relay when a short circuit has occurred can be prevented.

Further, arrangement of wires can be simplified by preventing wire increase due to addition of peripheral devices using a communication unit.

Further, an error resulting from mal-connection of complicated wires can be minimized by easily controlling the main controller without the complicated wires using the communication unit.

MODES FOR CARRYING OUT THE PREFERRED EMBODIMENTS

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

Description will now be given in detail of a drain device and a refrigerator having the same according to an embodiment, with reference to the accompanying drawings.

When it is mentioned that one component is "connected" or "accessed" to another component, it may be understood that the one component is directly connected or accessed to the another component or that still other component is interposed between the two components. A term of "include" or "have" should not be interpreted as if it absolutely includes a plurality of components or steps of the specification. Rather, the term of "include" or "have" may not include some components or some steps, or may further include additional components.

Hereinafter, a power relay assembly driving apparatus according to the present invention will be explained in more detail with reference to the attached drawings.

Figure 1:
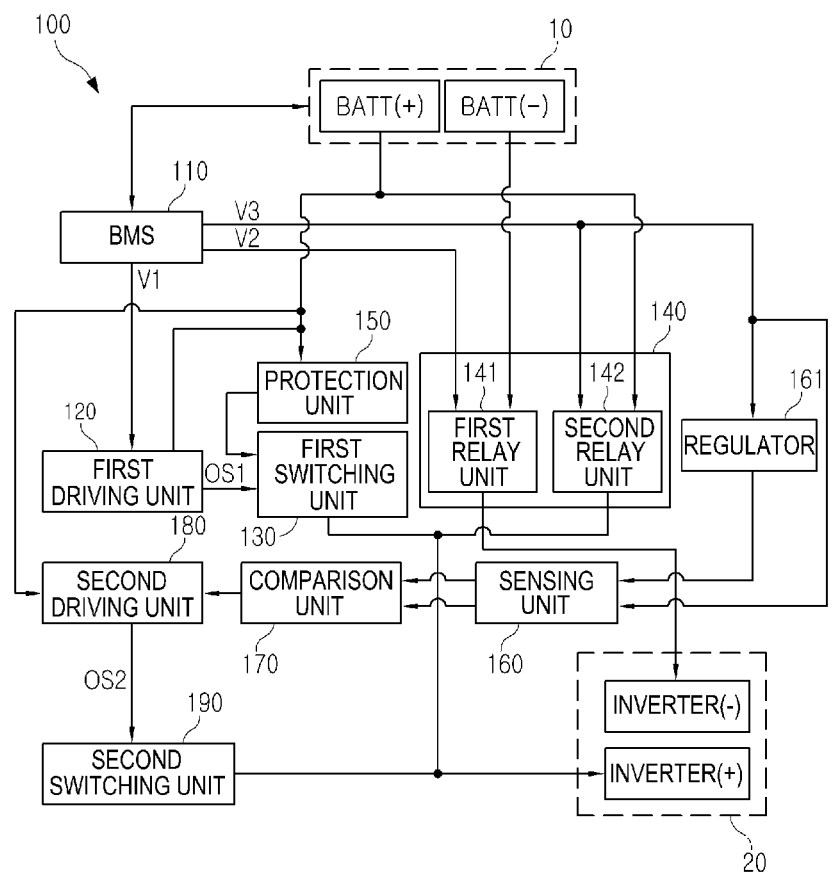
FIG. 1 is a block diagram of a power relay assembly driving apparatus according to a first embodiment of the present invention.

FIG. 1 is a block diagram of a power relay assembly driving apparatus according to a first embodiment of the present invention.

Referring to FIG. 1, the power relay assembly driving apparatus according to a first embodiment of the present invention 100 is connected between a battery unit 10 and an inverter unit 20, thereby supplying power to the inverter unit 20 from the battery unit 10 or cutting off power supply.

More specifically, the power relay assembly driving apparatus according to a first embodiment of the present invention 100 comprises a battery management system (BMS) 110, a first driving unit 120, a first switching unit 130, a relay unit 140 including a first relay unit 141 and a second relay unit 142, a protection unit 150, a sensing unit 160, a comparison unit 170, a second driving unit 180, and a second switching unit 190.

The BMS 110 is electrically-connected to the battery unit 10, thereby maintaining and controlling a state of the battery unit 10. Further, the BMS 110 controls the first relay unit 141 and the first switching unit 130 in order to pre-charge a capacitor (not shown) included in the inverter unit 20 with a power of the battery unit 10, controls the second relay unit 142 in order to normal-charge the capacitor (not shown) included in the inverter unit 20 with the power of the battery unit 10 and then controls the first switching unit 130 in order to end the pre-charging of the capacitor (not shown) included in the inverter 20, controls the second switching unit 190 upon a power cutoff of the battery unit 10 in order to form an equipotential between the second relay unit 142 and a second terminal of the inverter unit 20, and controls the second relay unit 142 in order to electrically separate a second terminal of the battery unit 10 and the second terminal of the inverter unit 20 from each other. The time of the power cutoff of the battery unit 10 may be a stopped state after a vehicle driving in a normal case, and may be a short-circuited state where an over-current has occurred in an abnormal case. In the present invention, the first terminal may be a minus (−) terminal and the second terminal may be a plus (+) terminal.

The BMS 110 outputs a first voltage (V1), a second voltage (V2) and a third voltage (V3), thereby providing the voltages to the first driving unit 120 and the relay unit 140. The BMS 110 may receive a commercial voltage from outside, convert the commercial voltage into the first voltage (V1) to the third voltage (V3), and output the first voltage (V1) to the third voltage (V3). The first voltage (V1) to the third voltage (V3) may be the same voltage, and preferably maintain a value of 10V or more and 14V or less.

Hereinafter, a control configuration operation by the BMS 110 will be explained in more detail.

The first driving unit 120 is connected among the second terminal of the battery unit 10, the BMS 110 and the first switching unit 130. The first driving unit 120 is operated by receiving the first voltage (V1) from the BMS 110, and outputs a first signal (OS1) for turning on the first switching unit 130. The operation of the first driving unit 120 is performed after the first relay unit 141 has received the second voltage (V2) from the BMS 110 to thus electrically-connect a first terminal of the battery unit 10 with a first terminal of the inverter unit 20. Although not shown, the first driving unit 120 may be composed of at least one resistor and at least one switch.

The first switching unit 130 is connected in parallel to the second relay unit 142 between the second terminal of the battery unit 10 and the second terminal of the inverter unit 20. The first switching unit 130 is operated by receiving a first signal (OS1) from the first driving unit 120, and pre-charges a capacitor (not shown) included in the inverter unit 20 with the power of the battery unit 10 together with the first relay unit 141. Although not shown, the first switching unit 130 may include an Insulated Gate Bipolar Transistor (IGBT) mainly used in a power system of high efficiency and high speed.

The first switching unit 130 is turned off while a normal charging is performed as the second relay unit 142 is turned on, thereby ending the pre-charging of the capacitor (not shown) included in the inverter unit 20.

The relay unit 140 is connected between the battery unit 10 and the inverter unit 20. The relay unit 140 electrically-connects the battery unit 10 and the inverter unit 20 with each other together with the first switching unit 130, thereby forming a path to pre-charge the capacitor (not shown) included in the inverter unit 20 for a first time with the power of the battery unit 10, or forming a path to normal-charge the capacitor with the power of the battery unit 10 after the pre-charging. The relay unit 140 electrically separates the battery unit 10 and the inverter unit 20 from each other. That is, the relay unit 140 electrically-connects or separates the battery unit 10 and the inverter unit 20 to/from each other, sequentially. Such relay unit 140 is electrically-connected to the first switching unit 130, and includes the first relay unit 141 and the second relay unit 142.

More specifically, the first relay unit 141 switches a connection between the first terminal of the battery unit 10 and the first terminal of the inverter unit 20. For this, the first relay unit 141 is operated by receiving the second voltage (V2) from the BMS 110, and electrically-connects the first terminal of the battery unit 10 with the first terminal of the inverter unit 20. That is, the first relay unit 141 is turned on by receiving the second voltage (V2), thereby electrically-connecting the first terminal of the battery unit 10 with the first terminal of the inverter unit 20. The first relay unit 141 electrically separates the first terminal of the battery unit 10 and the first terminal of the inverter unit 20 from each other if it is not provided with the second voltage (V2) from the BMS 110. Although not shown, the first relay unit 141 may be composed of coils and switches.

After the electrical-connection between the first terminal of the battery unit 10 and the first terminal of the inverter unit 20 by the first relay unit 141, the first driving unit 120 and the first switching unit 130 are turned on. In this case, the second terminal of the battery unit 10, the first switching unit 130, and the second terminal of the inverter unit 20 are electrically-connected to one another. As a result, the capacitor (not shown) included in the inverter unit 20 is pre-charged for a first time with the power of the battery unit 10. Upon ending of the pre-charging of the capacitor (not shown) included in the inverter unit 20, the first voltage (V1) provided to the first driving unit 120 is cut off and thus the first switching unit 130 is turned off.

The second relay unit 142 switches a connection between the second terminal of the battery unit 10 and the second terminal of the inverter unit 20. For this, the second relay unit 142 is operated by receiving the third voltage (V3) from the BMS 110, and electrically-connects the second terminal of the battery unit 10 with the second terminal of the inverter unit 20. That is, the second relay unit 142 is turned on by receiving the third voltage (V3), thereby electrically-connecting the second terminal of the battery unit 10 with the second terminal of the inverter unit 20. The second relay unit 142 electrically separates the second terminal of the battery unit 10 and the second terminal of the inverter unit 20 from each other if it is not provided with the third voltage (V3) from the BMS 110. Although not shown, the second relay unit 142 may be composed of coils and switches.

The protection unit 150 is connected among the second terminal of the battery unit 10, the first driving unit 120, and the first switching unit 130. While the capacitor (not shown) included in the inverter unit 20 is pre-charged with the power of the battery unit 10, the protection unit 150 controls a current flow according to a temperature sensed among the second terminal of the battery unit 10, the first switching unit 130, and the second terminal of the inverter unit 20. Although not shown, the protection unit 150 may be configured as a Positive Thermal Coefficient (PTC) thermistor. The PTC thermistor can cut off a current flow by increasing its resistance when its temperature increases. The protection unit 150 can prevent damage of the first switching unit 130 due to temperature increase.

The sensing unit 160 is connected between the relay unit 140 (more specifically, the second relay unit 142) and the second switching unit 190, and senses the third voltage (V3) provided to the second relay unit 142 from the BMS 110. Although not shown, the sensing unit 160 may be composed of at least one sensing resistor. A regulator 161 may be further connected between the second relay unit 142 and the sensing unit 160. Upon receipt of the third voltage (V3), the regulator 161 converts the third voltage (V3) into a regulator voltage and inputs the regulator voltage to the sensing unit 160. The third voltage (V3) directly output from the BMS 110 is also input to the sensing unit 160.

The comparison unit 170 is connected between the sensing unit 160 and the second switching unit 190. If the third voltage (V3) is cut off as the third voltage (V3) is not provided, the comparison unit 170 outputs a high signal. Such cutoff of the third voltage (V3) means start of an operation to turn off the second relay unit 142 in order to electrically separate the second relay unit 142 and the second terminal of the inverter unit 20 from each other. However, even if the third voltage (V3) provided to the second relay unit 142 is cut off in order to turn off the second relay unit 142, the second relay unit 142 is not immediately turned off. It takes a prescribed time for the second relay unit 142 to be completely turned off. The prescribed time means a time taken from a time point when the second relay unit 142 starts to be turned off, to a time point when the second relay unit 142 has been completely turned off. For instance, the prescribed time may be 10~30 ms. The high signal means a signal for turning on the second switching unit 190 for a prescribed time as an operation to turn off the second relay unit 142 has started.

Although not shown, the comparison unit 170 may be configured as a comparator having two input terminals and one output terminal. The sensing unit 160 is connected to the input terminals of the comparator. The output terminal of the comparator is connected to the second driving unit 180. If the third voltage (V3) provided to the second relay unit 142 is sensed by the sensing unit 160, the regulator voltage output from the regulator 161 and the third voltage (V3) output from the BMS 110 are provided to the input terminals of the comparator, respectively. As a result, a low signal is output to the output terminal of the comparator. On the other hand, if the third voltage (V3) provided to the second relay unit 142 is not sensed by the sensing unit 160, a voltage lower than the regulator voltage and the regulator voltage are provided to the input terminals of the comparator, respectively. As a result, a high signal is output to the output terminal of the comparator. The regulator voltage from the regulator 161 may also serve as a power of the comparator, thereby enabling a high signal to be output to the output terminal of the comparator for a short time period.

The second driving unit 180 is connected among the second terminal of the battery unit 10, the comparison unit 170, and the second switching unit 190. The second driving unit 180 is operated by receiving a high signal from the comparison unit 170, and outputs a second signal (OS2). Although not shown, the second driving unit 180 may be composed of at least one resistor and at least one switch.

The second switching unit 190 is connected in parallel to the second relay unit 142 between the second driving unit 180 and the second terminal of the inverter unit 20. The second switching unit 190 is operated by receiving the second signal (OS2) from the second driving unit 180. The second switching unit 190 is turned on before the second relay unit 142 is completely turned off, i.e., before the second relay unit 142 is completely turned off, after the third voltage (V3) provided to the second relay unit 142 is cut off. This is in order to form an equipotential between the second terminal of the second relay unit 142 and the second terminal of the inverter unit 20, at the time when the second relay unit 142 is turned off so as to electrically separate the battery unit 10 and the inverter unit 20 from each other under control of the BMS 110. The equipotential, formed between the second terminal of the second relay unit 142 and the second terminal of the inverter unit 20, prevents occurrence of an arc at a contact when the second relay unit 142 is turned off. As a result, an expensive special gas-charged relay, used to prevent occurrence of an arc at a contact of a relay, can be replaced by a cheap general relay. The second switching unit 190 is turned off after a second time after the second relay unit 142 has been turned off. The second time is a time before the first relay unit 141 is turned off after the second relay unit 142 has been turned off. Although not shown, the second switching unit 190 may be composed of a resistor, a zener diode and a switch.

The second switching unit 190 may be arranged in parallel to the first switching unit 130. As the second switching unit 190 is arranged in parallel to the first switching unit 130, a circuit design can be facilitated and a circuit balance can be implemented.

The first switching unit 130 and the second switching unit 190 may be configured as an Insulated Gate Bipolar Transistor (IGBT) mainly used in a power system of high efficiency and high speed. Alternatively, the first switching unit 130 and the second switching unit 190 may be configured as a Field Effect Transistor (FET), a Metal Oxide Semiconductor Field Effect Transistor (MOSFET) or a Solid State Relay (SSR). The first switching unit 130 and the second switching unit 190 can facilitate a circuit design, and allow a circuit to efficiently operate without a malfunction.

In the power relay assembly driving apparatus 100 according to a first embodiment of the present invention, the second switching unit 190 is turned on before the second relay unit 142 is completely turned off by the BMS 110. Accordingly, an equipotential can be formed between the second terminal of the second relay unit 142 and the second terminal of the inverter unit 20, at the time when the second relay unit 142 is turned off so as to electrically separate the battery unit 10 and the inverter unit 20 from each other. Due to the equipotential formed between the second terminal of the second relay unit 142 and the second terminal of the inverter unit 20, occurrence of an arc at a contact when the second relay unit 142 is turned off can be prevented. As a result, an expensive special gas-charged relay, used to prevent occurrence of an arc at a contact of a relay, can be replaced by a cheap general relay.

In the power relay assembly driving apparatus 100 according to a first embodiment of the present invention, a current flow is controlled according to a temperature sensed by the protection unit 150, so that damage of the first switching unit 130 due to temperature increase can be prevented.

Hereinafter, a method for driving the power relay assembly driving apparatus 100 according to a first embodiment of the present invention will be explained with reference to FIG. 1.

Figure 2:
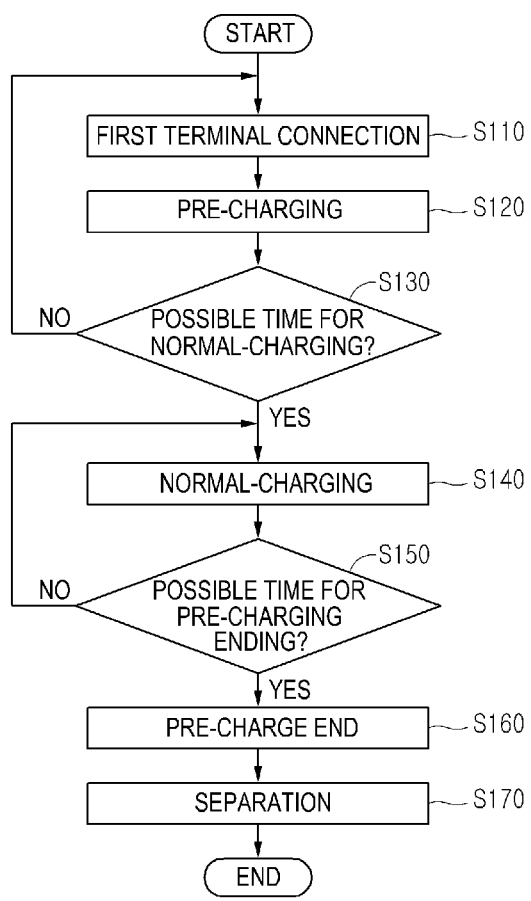
FIG. 2 is a flowchart showing a driving method by a power relay assembly driving apparatus according to a first embodiment of the present invention.
Figure 3:
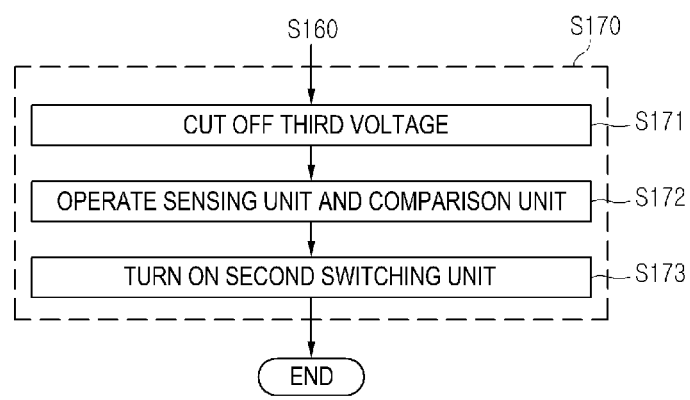
FIG. 3 is a view for explaining a separation step of FIG. 2 in more detail.
Figure 4:
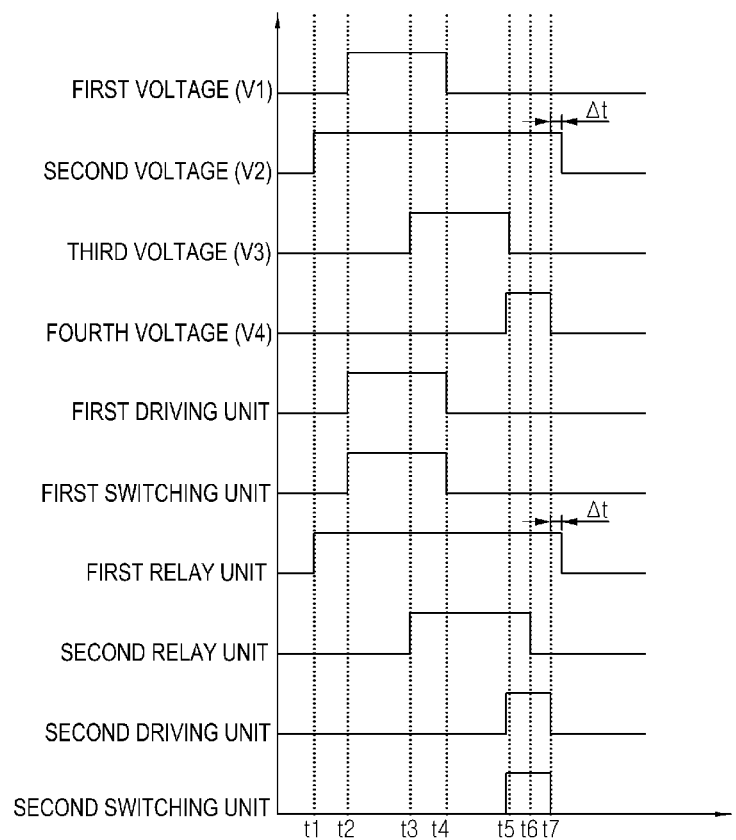
FIG. 4 is a view for explaining an operation timing of a device in a driving method by a power relay assembly driving apparatus according to a first embodiment of the present invention.

FIG. 2 is a flowchart showing a driving method by a power relay assembly driving apparatus according to a first embodiment of the present invention, FIG. 3 is a view for explaining a separation step of FIG. 2 in more detail, and FIG. 4 is a view for explaining an operation timing of a device in a driving method by a power relay assembly driving apparatus according to a first embodiment of the present invention.

Referring to FIGS. 2 to 4, the method for driving a power relay assembly driving apparatus 100 according to a first embodiment of the present invention includes a first terminal connection step (S110), a pre-charging step (S120), a normal-charging possible time determining step (S130), a normal-charging step (S140), a pre-charge end possible time determining step (S150), a pre-charge end step (S160) and a separation step (S170). In the method for driving a power relay assembly driving apparatus 100 according to a first embodiment of the present invention, power is supplied to the inverter unit 20 from the battery unit 10, or power supply is cut off.

It is assumed that the power relay assembly driving apparatus 100 according to a first embodiment of the present invention is in an 'OFF' state until 't1'.

In the first terminal connection step (S110), the first terminal of the battery unit 10 and the first terminal of the inverter unit 20 are electrically-connected to each other by the first relay unit 141, as the first relay unit 141 is turned on as shown in FIG. 4 by the first relay unit 141 under control of the BMS 110.

More specifically, as shown in FIG. 4, if a second voltage (V2) is provided to the first relay unit 141 from the BMS 110 at a time point 't1', the first relay unit 141 is turned on. As a result, the first terminal of the battery unit 10 and the first terminal of the inverter unit 20 are electrically-connected to each other.

In the pre-charging step (S120), the BMS 110 controls the first switching unit 130 after the first terminal connection step (S110). More specifically, as shown in FIG. 4, the first driving unit 120 and the first switching unit 130 are turned on to electrically-connect the second terminal of the battery unit 10, the first switching unit 130, and the second terminal of the inverter unit 20 to one another, thereby pre-charging a capacitor (not shown) included in the inverter unit 20 with a power of the battery unit 10. The pre-charging may be performed so that the capacitor (not shown) included in the inverter unit 20 can be charged about 80%~85% of capacitance of the capacitor for a preset time (e.g., first time).

More specifically, as shown in FIG. 4, as a first voltage (V1) is provided to the first driving unit 120 at a time point 't2', the first driving unit 120 is turned on to operate and a first signal (OS1) is provided to the first switching unit 130 from the first driving unit 120. Therefore, the first driving unit 120 and the first switching unit 130 operate sequentially, and the capacitor (not shown) included in the inverter 20 is pre-charged with the power of the battery unit 10.

In the normal-charging possible time determining step (S130), the BMS 110 determines whether the current time is a normal-charging possible time, after the pre-charging has been performed so that the capacitor (not shown) included in the inverter unit 20 can be charged about 80%~85% of capacitance of the capacitor for a preset time (e.g., first time).

In the normal-charging step (S140), the second relay unit 142 is controlled if it is determined, by the BMS 110, that the current time is a normal-charging possible time after the pre-charging (S120). That is, as shown in FIG. 4, the BMS 110 turns on the second relay unit 142 to electrically-connect the second terminal of the battery unit 10 with the second terminal of the inverter unit 20 through the second relay unit 142, thereby normal-charging the capacitor (not shown) included in the inverter unit 20 with the power of the battery unit 10. The normal-charging may be performed so that the capacitor (not shown) included in the inverter unit 20 can be charged about 100% of capacitance of the capacitor.

More specifically, as shown in FIG. 4, a third voltage (V3) is provided to the second relay unit 142 from the BMS 110 at a time point 't3', so that the second relay unit 142 is turned on. Until a time point 't4', the first voltage (V1) is continuously provided to the first driving unit 120 from the BMS 110.

In the pre-charge end possible time determining step (S150), the BMS 110 determines whether the current time is a pre-charge end possible time, after the normal-charging has been performed so that the capacitor (not shown) included in the inverter unit 20 can be charged about 100% of capacitance of the capacitor.

In the pre-charge end step (S160), the first switching unit 130 is controlled if it is determined, by the BMS 110, during the normal-charging step (S140) that the current time is a pre-charge end possible time. That is, as shown in FIG. 4, the first switching unit 130 is turned off, so that the pre-charging of the capacitor (not shown) included in the inverter unit 20 can be ended. The pre-charge end step (S160) is performed during the normal-charging step (S140) before the inverter unit 20 is operated.

More specifically, as shown in FIG. 4, the first voltage (V1) provided to the first driving unit 120 is cut off after a time point 't4'. As a result, the first driving unit 120 and the first switching unit 130 are turned off. Then, the second voltage (V2) and the third voltage (V3) are continuously provided to the first relay unit 141 and the second relay unit 142 from the BMS 110 until a time point 't5'. Under such configuration, the 'ON' state of the first relay unit 141 and the second relay unit 142 can be maintained.

In the separation step (S170), the second switching unit 190 is controlled when the power of the battery unit 10 is cut off during the normal-charging step (S140), in order to form an equipotential between the second relay unit 142 and the second terminal of the inverter unit 20. And the second relay unit 142 is controlled to electrically-separate the second terminal of the battery unit 10 and the second terminal of the inverter unit 20 from each other. The time of the power cutoff of the battery unit 10 may be a stopped state after a vehicle driving in a normal case, and may be a short-circuited state where an over-current has occurred in an abnormal case.

More specifically, as shown in FIG. 3, the separation step (S170) includes a third voltage cutting off step (S171), a step of operating a sensing unit and a comparison unit (S172) and a second switching unit turning-on step (S173).

In the third voltage cutting off step (S171), as shown in FIG. 4, the third voltage (V3) provided to the second relay unit 142 after a time point 't5' is cut off so that the second relay unit 142 starts to be turned off. And the second voltage (V2) provided to the first relay unit 141 is continuously provided until a time point 't7'.

In the step of operating a sensing unit and a comparison unit (S172), as shown in FIG. 4, when the third voltage (V3) is cut off after a time point 't5' and thus the second relay unit 142 starts to be turned off, the sensing unit 160 senses the cutoff of the third voltage (V3) and the comparison unit 170 is operated to output a high signal.

In the second switching unit turning-on step (S173), as shown in FIG. 4, the high signal is provided to the second driving unit 180 so that the second driving unit 180 is turned on at a time point 't5', and the second switching unit 190 which receives a second signal (OS2) from the second driving unit 180 is turned on. While the 'ON' state of the second switching unit 190 is maintained, the second relay unit 142 is completely turned off at a time point 't6' which is after a predetermined time from when the second relay unit 142 starts to be turned off.

As the second switching unit 190 is turned on before the second relay unit 142 is completely turned off after the cutoff of the third voltage (V3), an equipotential is formed between the second relay unit 142 and the second terminal of the inverter unit 20. Under such configuration, even if the second relay unit 142 is turned off, an arc does not occur at a contact of the second relay unit 142.

If a high signal is not provided to the second driving unit 180 after the second relay unit 142 has been completely turned off, the second driving unit 180 is turned off and thus the second switching unit 190 is turned off.

The second voltage (V2) provided to the first relay unit 141 after a prescribed time (Δt) from 't7' is cut off, so that the first relay unit 141 is turned off and the power relay assembly driving apparatus 100 is stopped. The prescribed time (Δt) may be 10~30 ms. The reason why the second voltage (V2) is cut off after a prescribed time (Δt) from 't7' is in order to prevent occurrence of an arc at a contact when the second switching unit 190 and the first relay unit 141 are simultaneously turned off.

Figure 5:
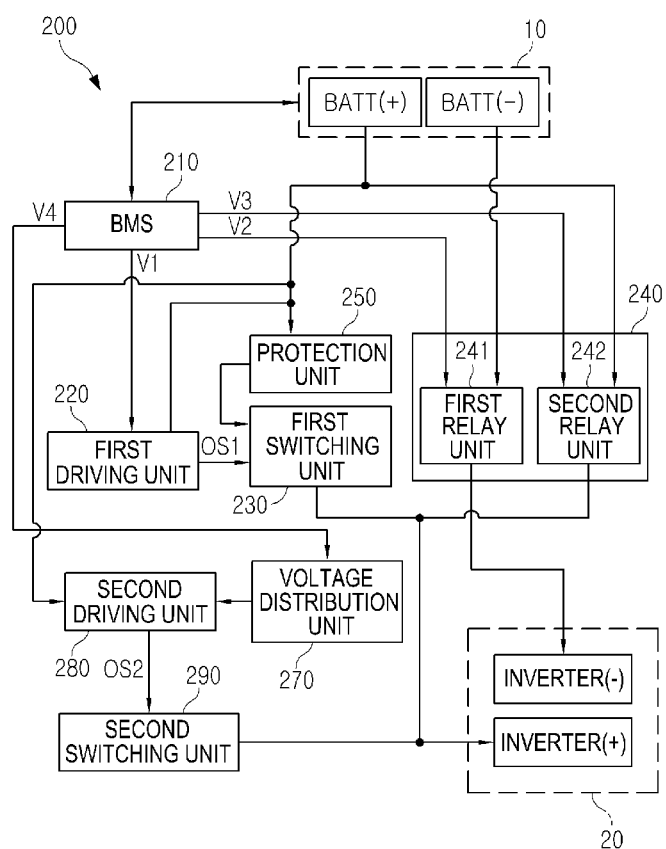
FIG. 5 is a block diagram of a power relay assembly driving apparatus according to a second embodiment of the present invention.

FIG. 5 is a block diagram of a power relay assembly driving apparatus according to a second embodiment of the present invention.

Referring to FIG. 5, the power relay assembly driving apparatus according to a second embodiment of the present invention 200 is connected between a battery unit 10 and an inverter unit 20, and is configured to supply power to the inverter unit 20 from the battery unit 10 or disconnects the power supply. Unlike the power relay assembly driving apparatus according to a first embodiment of the present invention 100, the power relay assembly driving apparatus according to a second embodiment of the present invention 200 does not include the sensing unit 160 and the comparison unit 170.

More specifically, the power relay assembly driving apparatus according to a second embodiment of the present invention 200 includes a BMS 210, a first driving unit 220, a first switching unit 230, a relay unit 240 having a first relay unit 241 and a second relay unit 242, a protection unit 250, a voltage distribution unit 270, a second driving unit 280, and a second switching unit 290.

The BMS 210 is similar to the BMS 110 of FIG. 1 except that the BMS 210 outputs a fourth voltage (V4) as well as a first voltage (V1), a second voltage (V2) and a third voltage (V3). The BMS 210 may receive a commercial voltage from outside, convert the commercial voltage into the first voltage (V1) to the fourth voltage (V4), and output the first voltage (V1) to the fourth voltage (V4). The first voltage (V1) to the fourth voltage (V4) may be the same voltage, and preferably maintain a value of 10V or more and 14V or less. The BMS 210 may provide the first voltage (V1) to the fourth voltage (V4) to the first driving unit 220, the relay unit 240 and the voltage distribution unit 270, sequentially. The first voltage (V1) to the third voltage (V3) have been aforementioned in FIG. 1, and thus detailed explanations thereof will be omitted. The fourth voltage (V4) is provided to the voltage distribution unit 270, and is converted into a distribution voltage. The distribution voltage is used to turn on the second driving unit 280.

The first driving unit 220, the first switching unit 230, the relay unit 240 and the protection unit 250 have the same configuration as the first driving unit 120, the first switching unit 130, the relay unit 140 and the protection unit 150 of FIG. 1, and perform the same operation. Accordingly, detailed explanations on the first driving unit 220, the first switching unit 230, the relay unit 240 and the protection unit 250 will be omitted.

The voltage distribution unit 270 is connected between the BMS 210 and the second driving unit 280. Before the BMS 210 cuts off the third voltage (V3) provided to the second relay unit 242 in order to electrically-separate a second terminal of the battery unit 10 and a second terminal of the inverter unit 20 from each other, the voltage distribution unit 270 receives the fourth voltage (V4) from the BMS 210 and outputs a distribution voltage. Although not shown, the voltage distribution unit 270 may include at least one resistor.

The second driving unit 280 is similar to the second driving unit 180 of FIG. 1 except the following. The second driving unit 280 is operated by receiving a distribution voltage from the voltage distribution unit 270 and outputs a second signal (OS2), whereas the second driving unit 180 of FIG. 1 is operated by receiving a high signal from the comparison unit 170. The second driving unit 280 has the same configuration as the second driving unit 180 of FIG. 1, and thus its detailed explanations will be omitted.

The second switching unit 290 has the same configuration as the second switching unit 190 of FIG. 1, and performs the same operation except that it is turned on before the third voltage (V3) provided to the second relay unit 242 is cut off.

In the power relay assembly driving apparatus 200 according to a second embodiment of the present invention, the second switching unit 290 is turned on before the second relay unit 242 is completely turned off under control of the BMS 210. As a result, an equipotential can be formed between the second relay unit 242 and the second terminal of the inverter unit 20 when the second relay unit 242 is turned off in order to electrically-separate the battery unit 10 and the inverter unit 20 from each other. Due to the equipotential formed between the second relay unit 242 and the second terminal of the inverter unit 20, occurrence of an arc at a contact when the second relay unit 242 is turned off can be prevented. As a result, an expensive special gas-charged relay, used to prevent occurrence of an arc at a contact of a relay, can be replaced by a cheap general relay.

Further, in the power relay assembly driving apparatus 200 according to a second embodiment of the present invention, damage of the first switching unit 230 due to temperature increase can be prevented by controlling a current flow according to a temperature sensed by the protection unit 250.

Further, in the power relay assembly driving apparatus 200 according to a second embodiment of the present invention, the second switching unit 290 is controlled using the voltage distribution unit 270 having a simplified configuration. As a result, a configuration and an operation of the entire circuit can be simplified.

Hereinafter, a method for driving a power relay assembly driving apparatus according to a second embodiment of the present invention will be explained with reference to FIG. 5.

Figure 6:
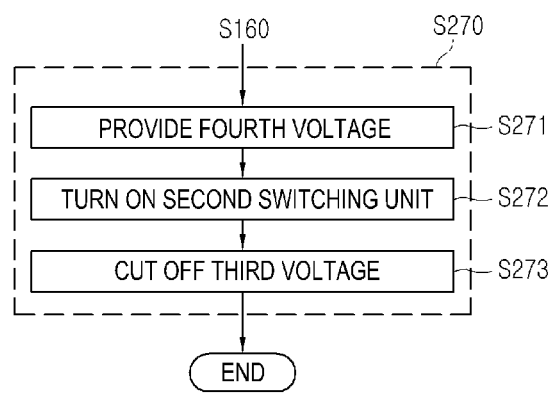
FIG. 6 is a view for explaining a separation step of a driving method by a power relay assembly driving apparatus according to a second embodiment of the present invention.
Figure 7:
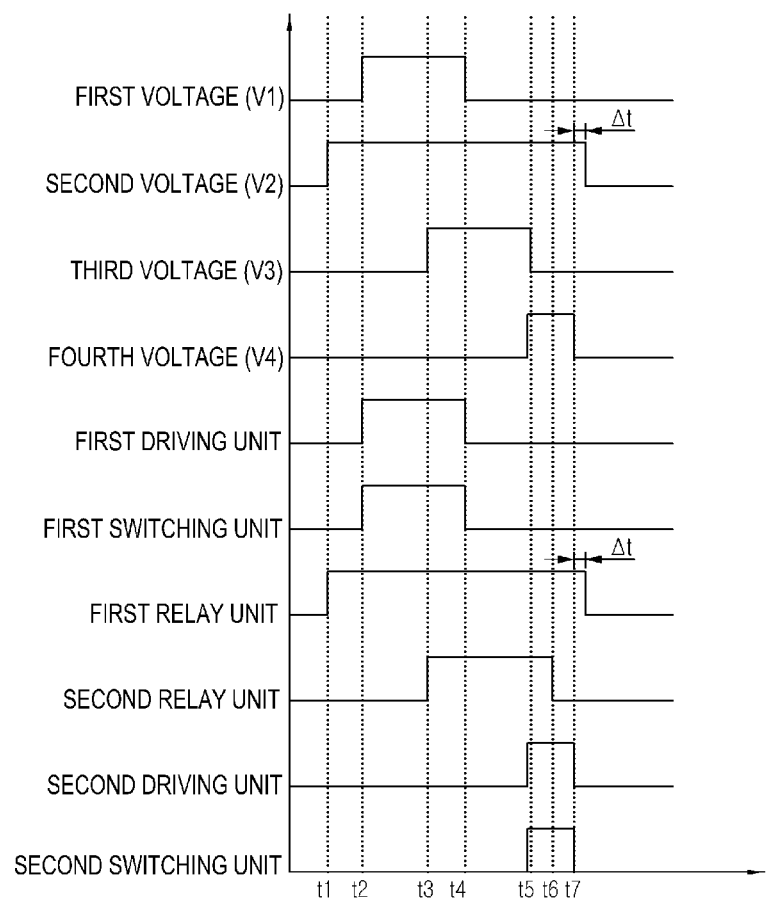
FIG. 7 is a view for explaining an operation timing of a device in a driving method by a power relay assembly driving apparatus according to a second embodiment of the present invention.

FIG. 6 is a view for explaining a separation step of a driving method by a power relay assembly driving apparatus according to a second embodiment of the present invention, and FIG. 7 is a view for explaining an operation timing of a device in a driving method by a power relay assembly driving apparatus according to a second embodiment of the present invention.

The method for driving a power relay assembly driving apparatus according to a second embodiment is the same as the method for driving a power relay assembly driving apparatus according to a first embodiment, except that a separation step (S270) is different from the separation step (S170).

That is, the method for driving a power relay assembly driving apparatus according to a second embodiment of the present invention includes a first terminal connection step (S110), a pre-charging step (S120), a normal-charging possible time determining step (S130), a normal-charging step (S140), a pre-charge end possible time determining step (S150), a pre-charge end step (S160) and a separation step (S270). In the method for driving a power relay assembly driving apparatus according to a second embodiment of the present invention, power is supplied to the inverter unit 20 from the battery unit 10, or power supply is cut off.

It is assumed that the power relay assembly driving apparatus 200 according to a second embodiment of the present invention is in an 'OFF' state until 't1'.

The first terminal connection step (S110), the pre-charging step (S120), the normal-charging possible time determining step (S130), the normal-charging step (S140), the pre-charge end possible time determining step (S150) and the pre-charge end step (S160) of the method for driving a power relay assembly driving apparatus according to a second embodiment are the same as the first terminal connection step (S110), the pre-charging step (S120), the normal-charging possible time determining step (S130), the normal-charging step (S140), the pre-charge end possible time determining step (S150) and the pre-charge end step (S160) of the method for driving a power relay assembly driving apparatus 100 according to a first embodiment. Therefore, detailed explanations of the same steps will be omitted.

In the separation step (S270), the second switching unit 290 is controlled when power supply from the battery unit 10 is cut off during the normal-charging step (S140), in order to form an equipotential between the second relay unit 242 and the second terminal of the inverter unit 20. And the second relay unit 242 is controlled so that the second terminal of the battery unit 10 and the second terminal of the inverter unit 20 can be electrically-separated from each other.

More specifically, as shown in FIG. 6, the separation step (S270) includes a fourth voltage providing step (S271), a second switching unit turning-on step (S272) and a third voltage cutting off step (S273).

In the fourth voltage providing step (S271), as shown in FIG. 7, the BMS 210 provides a fourth voltage (V4) to the voltage distribution unit 270 to operate the voltage distribution unit 270, before a time point 't5', i.e., before the second relay unit 242 starts to be turned off after 't5' as the third voltage (V3) is cut off. The voltage distribution unit 270 distributes the fourth voltage (V4), and provides a distribution voltage to the second driving unit 280.

In the second switching unit turning-on step (S272), a distribution voltage is provided to the second driving unit 280. As a result, as shown in FIG. 7, the second driving unit 280 is turned on before a time point 't5' and the second switching unit 290 which receives a second signal (OS2) from the second driving unit 280 is turned on.

In the third voltage cutting off step (S273), as shown in FIG. 7, the third voltage (V3) provided to the second relay unit 242 is cut off after a time point 't5'. Accordingly, the second relay unit 242 starts to be turned off, while the 'ON' state of the second switching unit 290 is maintained. The second relay unit 242 is completely turned off at a time point 't6' after a prescribed time lapses.

As the second switching unit 290 is turned on before the second relay unit 242 is completely turned off, an equipotential is formed between the second relay unit 242 and the second terminal of the inverter unit 20. Under such configuration, an arc does not occur at a contact of the second relay unit 242 even if the second relay unit 242 is turned off.

If the distribution voltage diverged from the fourth voltage (V4) is not provided to the second driving unit 280 after the second relay unit 242 is completely turned off, the second driving unit 280 is turned off and thus the second switching unit 290 is turned off.

The second voltage (V2) provided to the first relay unit 241 is cut off after a prescribed time (Δt) from 't7', so that the first relay unit 241 is turned off and the power relay assembly driving apparatus 200 is stopped. The prescribed time (Δt) may be 10~30 ms. The reason why the second voltage (V2) is cut off after a prescribed time (Δt) from 't7' is in order to prevent occurrence of an arc at a contact of the first relay unit 241 when the second switching unit 290 and the first relay unit 241 are simultaneously turned off.

Figure 8:
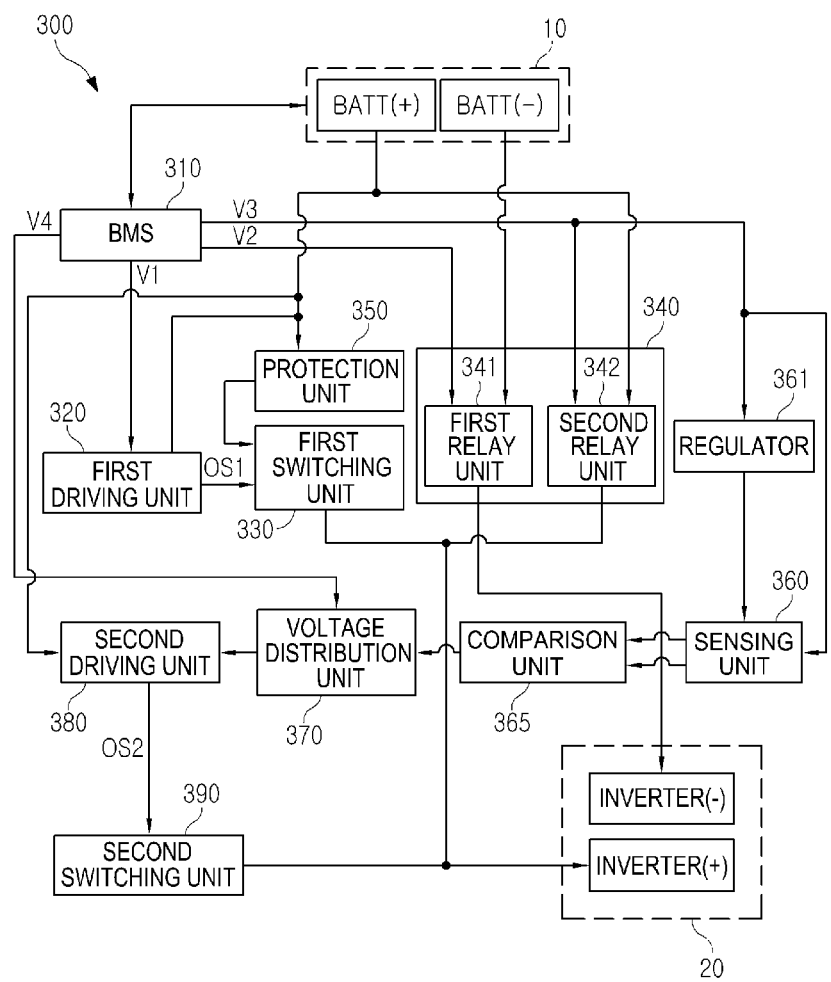
FIG. 8 is a block diagram of a power relay assembly driving apparatus according to a third embodiment of the present invention.

FIG. 8 is a block diagram of a power relay assembly driving apparatus according to a third embodiment of the present invention.

Referring to FIG. 8, the power relay assembly driving apparatus according to a second embodiment of the present invention 300 is connected between a battery unit 10 and an inverter unit 20, and is configured to supply power to the inverter unit 20 from the battery unit 10 or disconnects the power supply.

More specifically, the power relay assembly driving apparatus according to a second embodiment of the present invention 300 includes a BMS 310, a first driving unit 320, a first switching unit 330, a relay unit 340 having a first relay unit 341 and a second relay unit 342, a protection unit 350, a sensing unit 360, a comparison unit 365, a voltage distribution unit 370, a second driving unit 380, and a second switching unit 390.

The BMS 310 is similar to the BMS 110 of FIG. 1 except that the BMS 310 outputs a fourth voltage (V4) as well as a first voltage (V1), a second voltage (V2) and a third voltage (V3). The BMS 310 may receive a commercial voltage from outside, convert the commercial voltage into the first voltage (V1) to the fourth voltage (V4), and output the first voltage (V1) to the fourth voltage (V4). The first voltage (V1) to the fourth voltage (V4) may be the same voltage, and preferably maintain a value of 10V or more and 14V or less. The BMS 310 may provide the first voltage (V1) to the fourth voltage (V4) to the first driving unit 320, the relay unit 340 and the voltage distribution unit 370, sequentially. The first voltage (V1) to the third voltage (V3) have been aforementioned in FIG. 1, and thus detailed explanations thereof will be omitted. The fourth voltage is used to turn on the voltage distribution unit 370.

The first driving unit 320, the first switching unit 330, the relay unit 340, the protection unit 350, the sensing unit 360 and the comparison unit 365 have the same configuration as the first driving unit 120, the first switching unit 130, the relay unit 140, the protection unit 150, the sensing unit 160 and the comparison unit 170 of FIG. 1, and perform the same operation. Accordingly, detailed explanations on the first driving unit 320, the first switching unit 330, the relay unit 340, the protection unit 350, the sensing unit 360 and the comparison unit 365 will be omitted.

The voltage distribution unit 370 is connected among the BMS 310, the second driving unit 380 and the comparison unit 365. Before the BMS 310 cuts off the third voltage (V3) provided to the second relay unit 342 in order to electrically-separate a second terminal of the battery unit 10 and a second terminal of the inverter unit 20 from each other, the voltage distribution unit 370 receives the fourth voltage (V4) from the BMS 310 and outputs a distribution voltage. Although not shown, the voltage distribution unit 370 may include at least one resistor.

The second driving unit 380 is similar to the second driving unit 180 of FIG. 1 except the following. The second driving unit 380 is operated by receiving a distribution voltage diverged from one of the fourth voltage (V4) provided to the voltage distribution unit 370 from the BMS 310, and a high-signal voltage provided to the voltage distribution unit 370 from the comparison unit 365, and outputs a second signal (OS2), whereas the second driving unit 180 of FIG. 1 is operated by receiving a high signal from the comparison unit 170. The second driving unit 380 has the same configuration as the second driving unit 180 of FIG. 1, and thus its detailed explanations will be omitted.

In the power relay assembly driving apparatus 300 according to a third embodiment of the present invention, the second switching unit 390 is turned on before the second relay unit 342 is completely turned off under control of the BMS 310. As a result, an equipotential can be formed between the second relay unit 342 and the second terminal of the inverter unit 20 when the second relay unit 342 is turned off in order to electrically-separate the battery unit 10 and the inverter unit 20 from each other. Due to the equipotential formed between the second relay unit 342 and the second terminal of the inverter unit 20, occurrence of an arc at a contact when the second relay unit 342 is turned off can be prevented. As a result, an expensive special gas-charged relay, used to prevent occurrence of an arc at a contact of a relay, can be replaced by a cheap general relay.

Further, in the power relay assembly driving apparatus 300 according to a third embodiment of the present invention, damage of the first switching unit 330 due to temperature increase can be prevented by controlling a current flow according to a temperature sensed by the protection unit 350.

Hereinafter, a method for driving the power relay assembly driving apparatus according to a third embodiment of the present invention will be explained with reference to FIG. 8.

Figure 9:
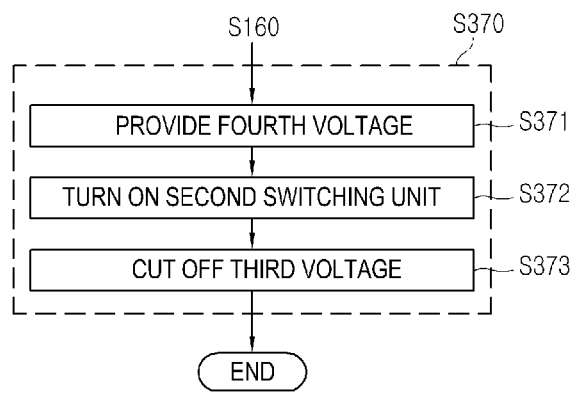
FIG. 9 is a view for explaining a separation step of a driving method by a power relay assembly driving apparatus according to a third embodiment of the present invention.
Figure 10:
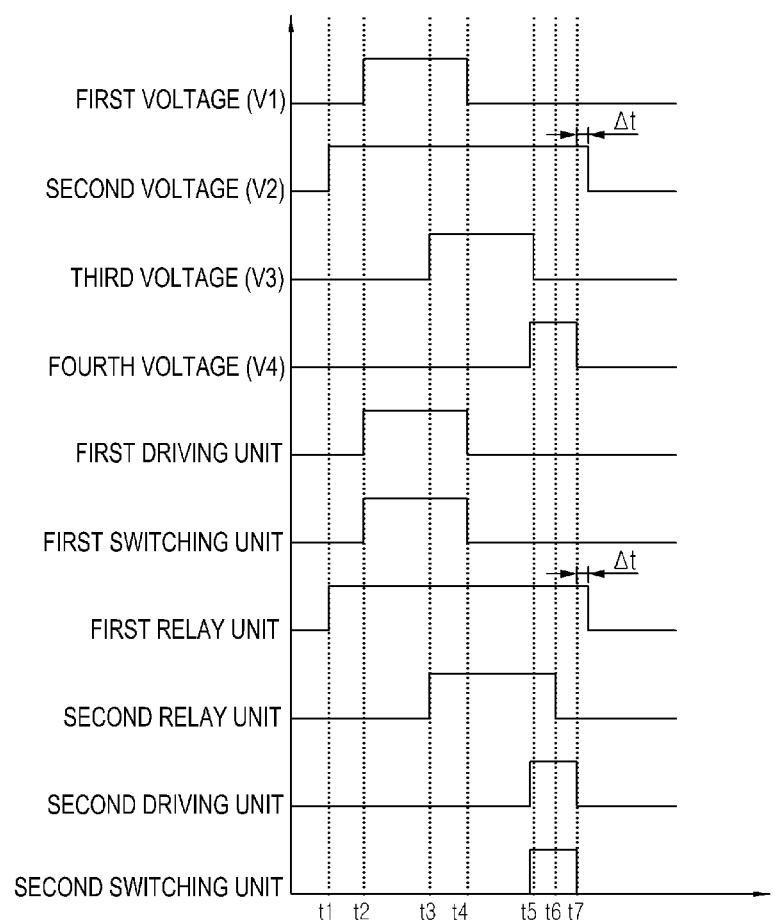
FIG. 10 is a view for explaining an operation timing of a device in a driving method by a power relay assembly driving apparatus according to a third embodiment of the present invention.

FIG. 9 is a view for explaining a separation step of a driving method by a power relay assembly driving apparatus according to a third embodiment of the present invention, and FIG. 10 is a view for explaining an operation timing of a device in a driving method by a power relay assembly driving apparatus according to a third embodiment of the present invention.

The method for driving a power relay assembly driving apparatus according to a third embodiment is the same as the method for driving a power relay assembly driving apparatus according to a first embodiment shown in FIG. 2, except that a separation step (S370) is different from the separation step (S170).

That is, the method for driving a power relay assembly driving apparatus according to a third embodiment of the present invention includes a first terminal connection step (S110), a pre-charging step (S120), a normal-charging possible time determining step (S130), a normal-charging step (S140), a pre-charge end possible time determining step (S150), a pre-charge end step (S160) and a separation step (S370). In the method for driving a power relay assembly driving apparatus according to a third embodiment of the present invention, power is supplied to the inverter unit 20 from the battery unit 10, or power supply is cut off.

It is assumed that the power relay assembly driving apparatus 300 according to a third embodiment of the present invention is in an 'OFF' state until 't1'.

The first terminal connection step (S110), the pre-charging step (S120), the normal-charging possible time determining step (S130), the normal-charging step (S140), the pre-charge end possible time determining step (S150) and the pre-charge end step (S160) of the method for driving a power relay assembly driving apparatus according to a third embodiment are the same as the first terminal connection step (S110), the pre-charging step (S120), the normal-charging possible time determining step (S130), the normal-charging step (S140), the pre-charge end possible time determining step (S150) and the pre-charge end step (S160) of the method for driving a power relay assembly driving apparatus 100 according to a first embodiment. Therefore, detailed explanations of the same steps will be omitted.

In the separation step (S370), the second switching unit 390 is controlled when power supply from the battery unit 10 is cut off during the normal-charging step (S140), in order to form an equipotential between the second relay unit 342 and the second terminal of the inverter unit 20. And the second relay unit 342 is controlled so that the second terminal of the battery unit 10 and the second terminal of the inverter unit 20 can be electrically-separated from each other.

More specifically, as shown in FIG. 9, the separation step (S370) includes a fourth voltage providing step (S371), a second switching unit turning-on step (S372) and a third voltage cutting off step (S373). The separation step (S370) corresponds to a case where a distribution voltage diverged from a fourth voltage is provided to the second driving unit 380.

In the fourth voltage providing step (S371), as shown in FIG. 10, the BMS 310 provides a fourth voltage (V4) to the voltage distribution unit 370 to operate the voltage distribution unit 370, before a time point 't5', i.e., before the second relay unit 342 starts to be turned off after 't5' as the third voltage (V3) is cut off. The voltage distribution unit 370 distributes the fourth voltage (V4), and provides a distribution voltage to the second driving unit 380.

In the second switching unit turning-on step (S372), a distribution voltage is provided to the second driving unit 380. As a result, as shown in FIG. 7, the second driving unit 380 is turned on before a time point 't5' and the second switching unit 390 which receives a second signal (OS2) from the second driving unit 380 is turned on.

In the third voltage cutting off step (S373), as shown in FIG. 10, the third voltage (V3) provided to the second relay unit 342 after a time point 't5' is cut off. Accordingly, the second relay unit 342 starts to be turned off, while the 'ON' state of the second switching unit 390 is maintained. The second relay unit 342 is completely turned off at a time point 't6' after a prescribed time lapses.

Although not shown, in a case where a distribution voltage diverged from the high signal provided to the voltage distribution unit 370 from the comparison unit 365 is provided to the second driving unit 380, the separation step (S370) is performed in the same manner as the separation step (S170).

As the second switching unit 390 is turned on before the second relay unit 342 is completely turned off, an equipotential is formed between the second relay unit 342 and the second terminal of the inverter unit 20. Under such configuration, an arc does not occur at a contact of the second relay unit 342 even if the second relay unit 342 is turned off.

If a distribution voltage is not provided to the second driving unit 380 after the second relay unit 342 is completely turned off, the second driving unit 380 is turned off and thus the second switching unit 390 is turned off.

The second voltage (V2) provided to the first relay unit 341 is cut off after a prescribed time ($\Delta t$) from 't7', so that the first relay unit 341 is turned off and the power relay assembly driving apparatus 300 is stopped. The prescribed time ($\Delta t$) may be 10~30 ms. The reason why the second voltage (V2) is cut off after a prescribed time ($\Delta t$) from 't7' is in order to prevent occurrence of an arc at a contact of the first relay unit 341 when the second switching unit 390 and the first relay unit 341 are simultaneously turned off.

Figure 11:
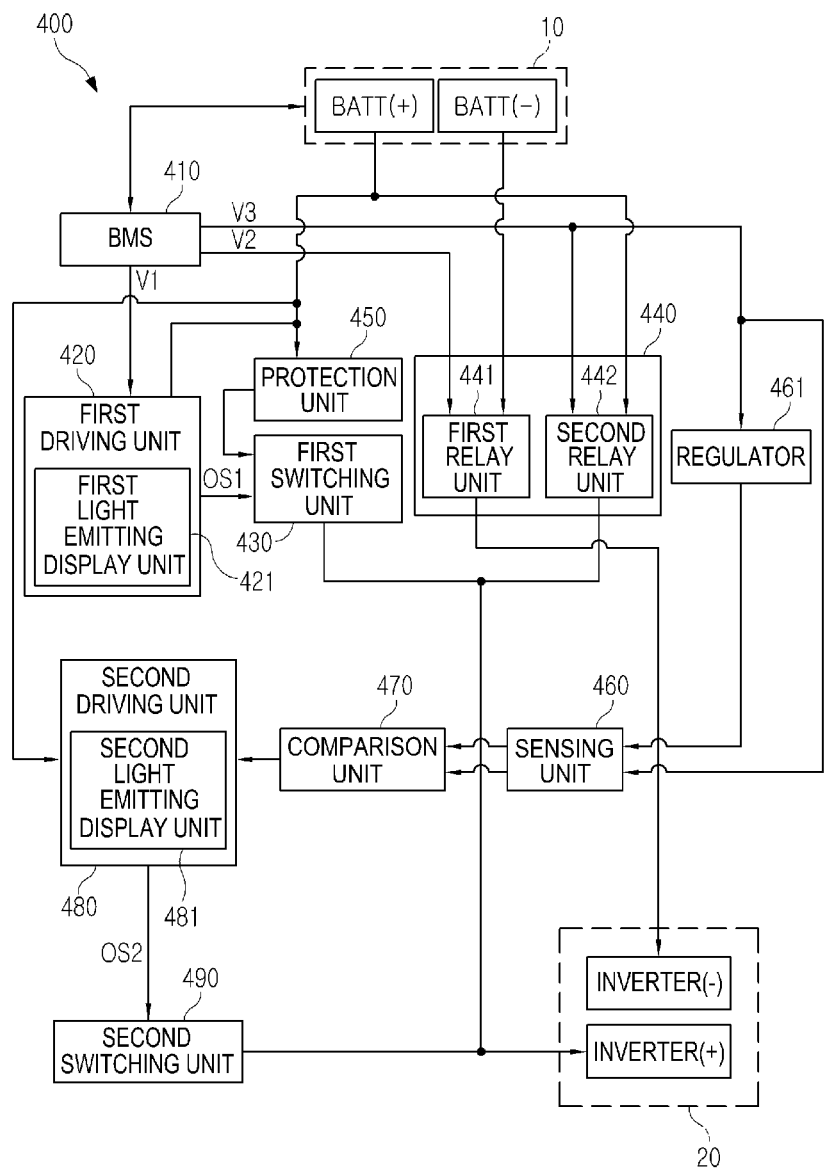
FIG. 11 is a block diagram of a power relay assembly driving apparatus according to a fourth embodiment of the present invention.

FIG. 11 is a block diagram of a power relay assembly driving apparatus according to a fourth embodiment of the present invention.

Referring to FIG. 11, the power relay assembly driving apparatus according to a fourth embodiment of the present invention 400 is connected between a battery unit 10 and an inverter unit 20, and is configured to supply power to the inverter unit 20 from the battery unit 10 or disconnects the power supply.

More specifically, the power relay assembly driving apparatus according to a fourth embodiment of the present invention 400 includes a BMS 410, a first driving unit 420, a first switching unit 430, a relay unit 440 having a first relay unit 441 and a second relay unit 442, a protection unit 450, a sensing unit 460, a comparison unit 470, a second driving unit 480, and a second switching unit 490.

The BMS 410 has the same configuration and performs the same operation as the BMS 110 of FIG. 1. Accordingly, detailed explanations of the BMS 410 will be omitted.

The first driving unit 420 is similar to the first driving unit 120 of FIG. 1 except that the first driving unit 420 further includes a first light emitting display unit 421. The first light emitting display unit 421 is turned on to emit light, while the first driving unit 420 provides a first signal (OS1) to the first switching unit 430. The first light emitting display unit 421 may be configured as a light emitting diode. The first driving unit 420 turns on the first light emitting display unit 421 while supplying the first signal (OS1) to the first switching unit 430, so that the supply of the first signal (OS1) can be easily checked.

The first switching unit 430, the relay unit 440, the protection unit 450, the sensing unit 460 and the comparison unit 470 have the same configuration as the first switching unit 130, the relay unit 140, the protection unit 150, the sensing unit 160 and the comparison unit 170 of FIG. 1, and perform the same operation. Accordingly, detailed explanations on the first switching unit 430, the relay unit 440, the protection unit 450, the sensing unit 460 and the comparison unit 470 will be omitted.

The second driving unit 480 is similar to the second driving unit 180 of FIG. 1 except that the second driving unit 480 further includes a second light emitting display unit 481. The second light emitting display unit 481 is turned on to emit light, while the second driving unit 480 provides a second signal (OS2) to the second switching unit 490. The first light emitting display unit 481 may be configured as a light emitting diode. The second driving unit 480 turns on the second light emitting display unit 481 while supplying the second signal (OS2) to the second switching unit 490, so that the supply of the second signal (OS2) can be easily checked.

The second switching unit 490 has the same configuration and performs the same operation, as the second switching unit 190 of FIG. 1. Accordingly, detailed explanations on the second switching unit 490 will be omitted.

In the power relay assembly driving apparatus 400 according to a fourth embodiment of the present invention, the second switching unit 490 is turned on before the second relay unit 442 is completely turned off under control of the BMS 410. As a result, an equipotential can be formed between the second relay unit 442 and the second terminal of the inverter unit 20 when the second relay unit 442 is turned off in order to electrically-separate the battery unit 10 and the inverter unit 20 from each other. Due to the equipotential formed between the second relay unit 442 and the second terminal of the inverter unit 20, occurrence of an arc at a contact when the second relay unit 442 is turned off can be prevented. As a result, an expensive special gas-charged relay, used to prevent occurrence of an arc at a contact of a relay, can be replaced by a cheap general relay.

Further, in the power relay assembly driving apparatus 400 according to a fourth embodiment of the present invention, damage of the first switching unit 430 due to temperature increase can be prevented by controlling a current flow according to a temperature sensed by the protection unit 450.

Further, the power relay assembly driving apparatus 400 according to a fourth embodiment of the present invention can easily check an operation of the first switching unit 430 and the second switching unit 490 using the first light emitting display unit 421 and the second light emitting display unit 481.

Like the method for driving a power relay assembly driving apparatus according to a first embodiment of FIG. 3, the method for driving a power relay assembly driving apparatus according to a fourth embodiment present invention includes a first terminal connection step (S110), a pre-charging step (S120), a normal-charging possible time determining step (S130), a normal-charging step (S140), a pre-charge end possible time determining step (S150), a pre-charge end step (S160) and a separation step (S170).

The method for driving a power relay assembly driving apparatus according to a fourth embodiment is the same as the method for driving a power relay assembly driving apparatus according to a first embodiment, except that the pre-charging step (S120) includes a process of turning-on the first light emitting display unit 421, and the separation step (S170) includes a process of turning-on the second light emitting display unit 481. Therefore, detailed explanations on the method for driving a power relay assembly driving apparatus according to a fourth embodiment will be omitted.

Figure 12:
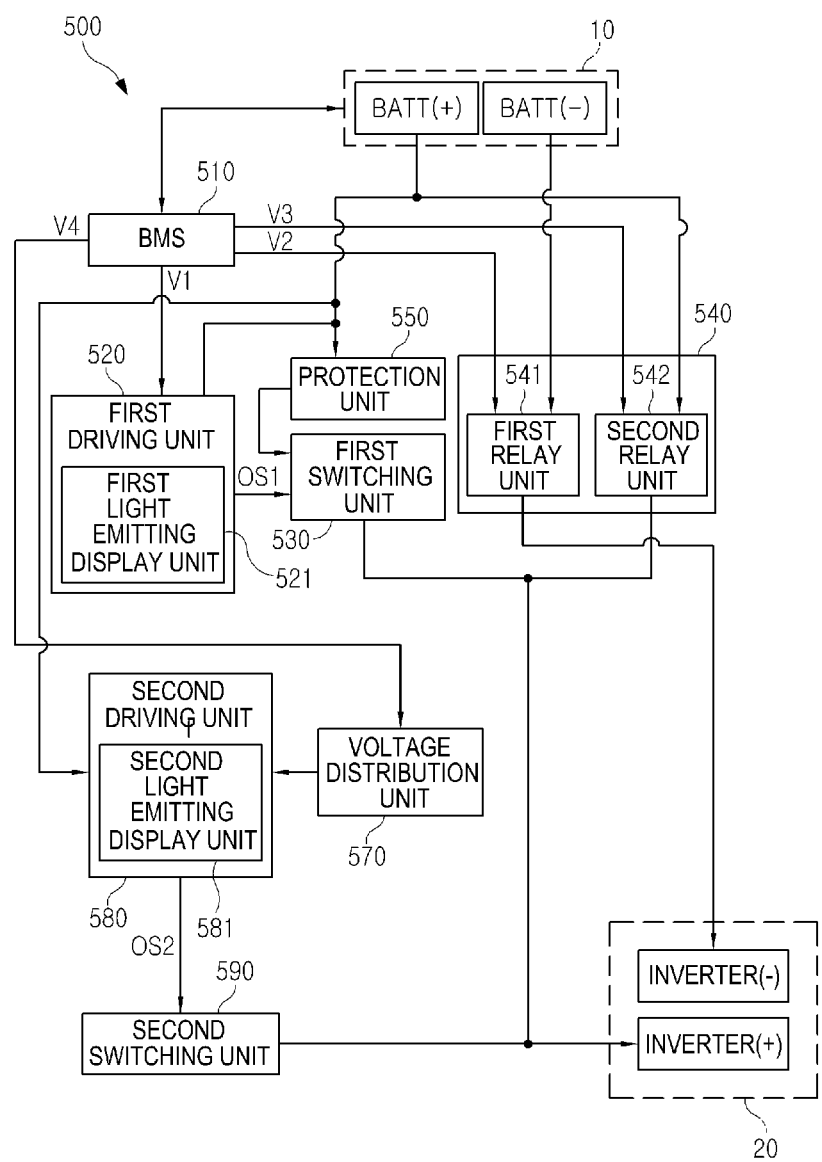
FIG. 12 is a block diagram of a power relay assembly driving apparatus according to a fifth embodiment of the present invention.

FIG. 12 is a block diagram of a power relay assembly driving apparatus according to a fifth embodiment of the present invention.

Referring to FIG. 12, the power relay assembly driving apparatus according to a fifth embodiment of the present invention 500 is connected between a battery unit 10 and an inverter unit 20, and is configured to supply power to the inverter unit 20 from the battery unit 10 or disconnects the power supply.

More specifically, the power relay assembly driving apparatus 500 according to a fifth embodiment of the present invention 500 includes a BMS 510, a first driving unit 520, a first switching unit 530, a relay unit 540 having a first relay unit 541 and a second relay unit 542, a protection unit 550, a voltage distribution unit 570, a second driving unit 580, and a second switching unit 590.

The BMS 510 has the same configuration and performs the same operation, as the BMS 210 of FIG. 5. Accordingly, detailed explanations of the BMS 510 will be omitted.

The first driving unit 520 is similar to the first driving unit 220 of FIG. 5 except that the first driving unit 520 further includes a first light emitting display unit 521. The first light emitting display unit 521 is turned on to emit light, while the first driving unit 520 provides a first signal (OS1) to the first switching unit 530. The first light emitting display unit 521 may be configured as a light emitting diode. The first driving unit 520 turns on the first light emitting display unit 521 while supplying the first signal (OS1) to the first switching unit 530, so that the supply of the first signal (OS1) can be easily checked.

The first switching unit 530, the relay unit 540, the protection unit 550, and the voltage distribution unit 570 have the same configuration as the first switching unit 230, the relay unit 240, the protection unit 250, and the voltage distribution unit 270 of FIG. 5, and perform the same operation. Accordingly, detailed explanations on the first switching unit 530, the relay unit 540, the protection unit 550, and the voltage distribution unit 570 will be omitted.

The second driving unit 580 is similar to the second driving unit 280 of FIG. 5 except that the second driving unit 580 further includes a second light emitting display unit 581. The second light emitting display unit 581 is turned on to emit light, while the second driving unit 580 provides a second signal (OS2) to the second switching unit 590. The second light emitting display unit 581 may be configured as a light emitting diode. The second driving unit 580 turns on the second light emitting display unit 581 while supplying the second signal (OS2) to the second switching unit 590, so that the supply of the second signal (OS2) can be easily checked.

The second switching unit 590 has the same configuration and performs the same operation, as the second switching unit 290 of FIG. 5. Accordingly, detailed explanations on the second switching unit 590 will be omitted.

In the power relay assembly driving apparatus 500 according to a fifth embodiment of the present invention, the second switching unit 590 is turned on before the second relay unit 542 is completely turned off under control of the BMS 510. As a result, an equipotential can be formed between the second relay unit 542 and the second terminal of the inverter unit 20 when the second relay unit 542 is turned off in order to electrically-separate the battery unit 10 and the inverter unit 20 from each other. Due to the equipotential formed between the second relay unit 542 and the second terminal of the inverter unit 20, occurrence of an arc at a contact when the second relay unit 542 is turned off can be prevented. As a result, an expensive special gas-charged relay, used to prevent occurrence of an arc at a contact of a relay, can be replaced by a cheap general relay.

Further, in the power relay assembly driving apparatus 500 according to a fifth embodiment of the present invention, damage of the first switching unit 530 due to temperature increase can be prevented by controlling a current flow according to a temperature sensed by the protection unit 550.

Further, the power relay assembly driving apparatus 500 according to a fifth embodiment of the present invention can easily check an operation of the first switching unit 530 and the second switching unit 590 using the first light emitting display unit 521 and the second light emitting display unit 581.

Like the method for driving a power relay assembly driving apparatus according to a second embodiment, the method for driving a power relay assembly driving apparatus according to a fifth embodiment present invention includes a first terminal connection step (S110), a pre-charging step (S120), a normal-charging possible time determining step (S130), a normal-charging step (S140), a pre-charge end possible time determining step (S150), a pre-charge end step (S160) and a separation step (S270).

The method for driving a power relay assembly driving apparatus according to a fifth embodiment is the same as the method for driving a power relay assembly driving apparatus according to a second embodiment, except that the pre-charging step (S120) includes a process of turning-on the first light emitting display unit 521, and the separation step (S270) includes a process of turning-on the second light emitting display unit 581. Therefore, detailed explanations on the method for driving a power relay assembly driving apparatus according to a fifth embodiment will be omitted.

Figure 13:
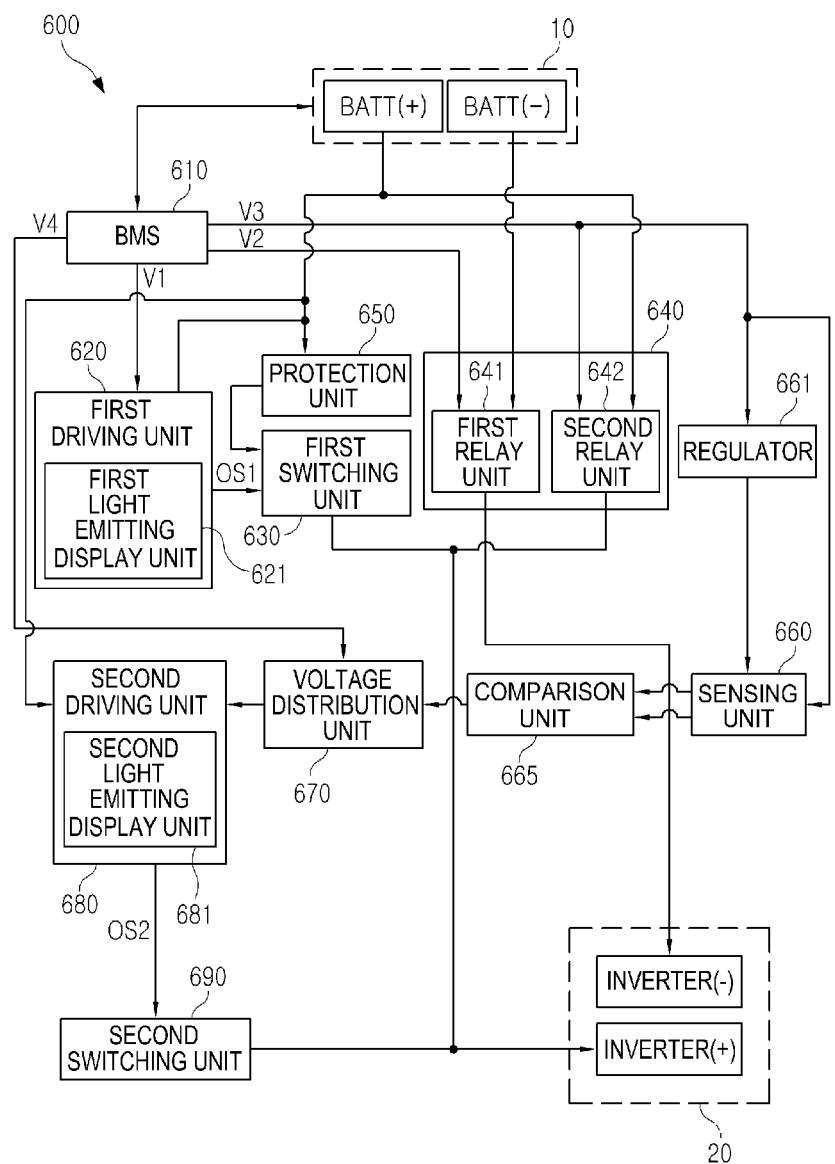
FIG. 13 is a block diagram of a power relay assembly driving apparatus according to a sixth embodiment of the present invention.

FIG. 13 is a block diagram of a power relay assembly driving apparatus according to a sixth embodiment of the present invention.

Referring to FIG. 13, the power relay assembly driving apparatus according to a sixth embodiment of the present invention 600 is connected between a battery unit 10 and an inverter unit 20, and is configured to supply power to the inverter unit 20 from the battery unit 10 or disconnects the power supply.

More specifically, the power relay assembly driving apparatus according to a sixth embodiment of the present invention 600 includes a BMS 610, a first driving unit 620, a first switching unit 630, a relay unit 640 having a first relay unit 641 and a second relay unit 642, a protection unit 650, a sensing unit 660, a comparison unit 665, a voltage distribution unit 670, a second driving unit 680, and a second switching unit 690.

The BMS 610 has the same configuration and performs the same operation, as the BMS 310 of FIG. 8. Accordingly, detailed explanations of the BMS 610 will be omitted.

The first driving unit 620 is similar to the second driving unit 320 of FIG. 8 except that the first driving unit 620 further includes a first light emitting display unit 621. The first light emitting display unit 621 is turned on to emit light, while the first driving unit 620 provides a first signal (OS1) to the first switching unit 630. The first light emitting display unit 621 may be configured as a light emitting diode. The first driving unit 620 turns on the first light emitting display unit 621 while supplying the first signal (OS1) to the first switching unit 630, so that the supply of the first signal (OS1) can be easily checked.

The first switching unit 630, the relay unit 640, the protection unit 650, the sensing unit 660, the comparison unit 665 and the voltage distribution unit 670 have the same configuration as the first switching unit 330, the relay unit 340, the protection unit 350, the sensing unit 360, the comparison unit 365, and the voltage distribution unit 370 of FIG. 8, and perform the same operation. Accordingly, detailed explanations on the first switching unit 630, the relay unit 640, the protection unit 650, the sensing unit 660, the comparison unit 665, and the voltage distribution unit 670 will be omitted.

The second driving unit 680 is similar to the second driving unit 380 of FIG. 8 except that the second driving unit 680 further includes a second light emitting display unit 681. The second light emitting display unit 681 is turned on to emit light, while the second driving unit 680 provides a second signal (OS2) to the second switching unit 690. The second light emitting display unit 681 may be configured as a light emitting diode. The second driving unit 680 turns on the second light emitting display unit 681 while supplying the second signal (OS2) to the second switching unit 690, so that the supply of the second signal (OS2) can be easily checked.

The second switching unit 690 has the same configuration and performs the same operation, as the second switching unit 390 of FIG. 8. Accordingly, detailed explanations on the second switching unit 690 will be omitted.

In the power relay assembly driving apparatus 600 according to a sixth embodiment of the present invention, the second switching unit 690 is turned on before the second relay unit 642 is completely turned off under control of the BMS 610. As a result, an equipotential can be formed between the second relay unit 642 and the second terminal of the inverter unit 20 when the second relay unit 642 is turned off in order to electrically-separate the battery unit 10 and the inverter unit 20 from each other. Due to the equipotential formed between the second relay unit 642 and the second terminal of the inverter unit 20, occurrence of an arc at a contact when the second relay unit 642 is turned off can be prevented. As a result, an expensive special gas-charged relay, used to prevent occurrence of an arc at a contact of a relay, can be replaced by a cheap general relay.

Further, in the power relay assembly driving apparatus 600 according to a sixth embodiment of the present invention, damage of the first switching unit 630 due to temperature increase can be prevented by controlling a current flow according to a temperature sensed by the protection unit 650.

Further, the power relay assembly driving apparatus 600 according to a sixth embodiment of the present invention can easily check an operation of the first switching unit 630 and the second switching unit 690 using the first light emitting display unit 621 and the second light emitting display unit 681.

Like the method for driving a power relay assembly driving apparatus according to a third embodiment, the method for driving a power relay assembly driving apparatus according to a sixth embodiment present invention includes a first terminal connection step (S110), a pre-charging step (S120), a normal-charging possible time determining step (S130), a normal-charging step (S140), a pre-charge end possible time determining step (S150), a pre-charge end step (S160) and a separation step (S370).

The method for driving a power relay assembly driving apparatus according to a sixth embodiment is the same as the method for driving a power relay assembly driving apparatus according to a third embodiment, except that the pre-charging step (S120) includes a process of turning-on the first light emitting display unit 621, and the separation step (S370) includes a process of turning-on the second light emitting display unit 681. Therefore, detailed explanations on the method for driving a power relay assembly driving apparatus according to a sixth embodiment will be omitted.

Figure 14:
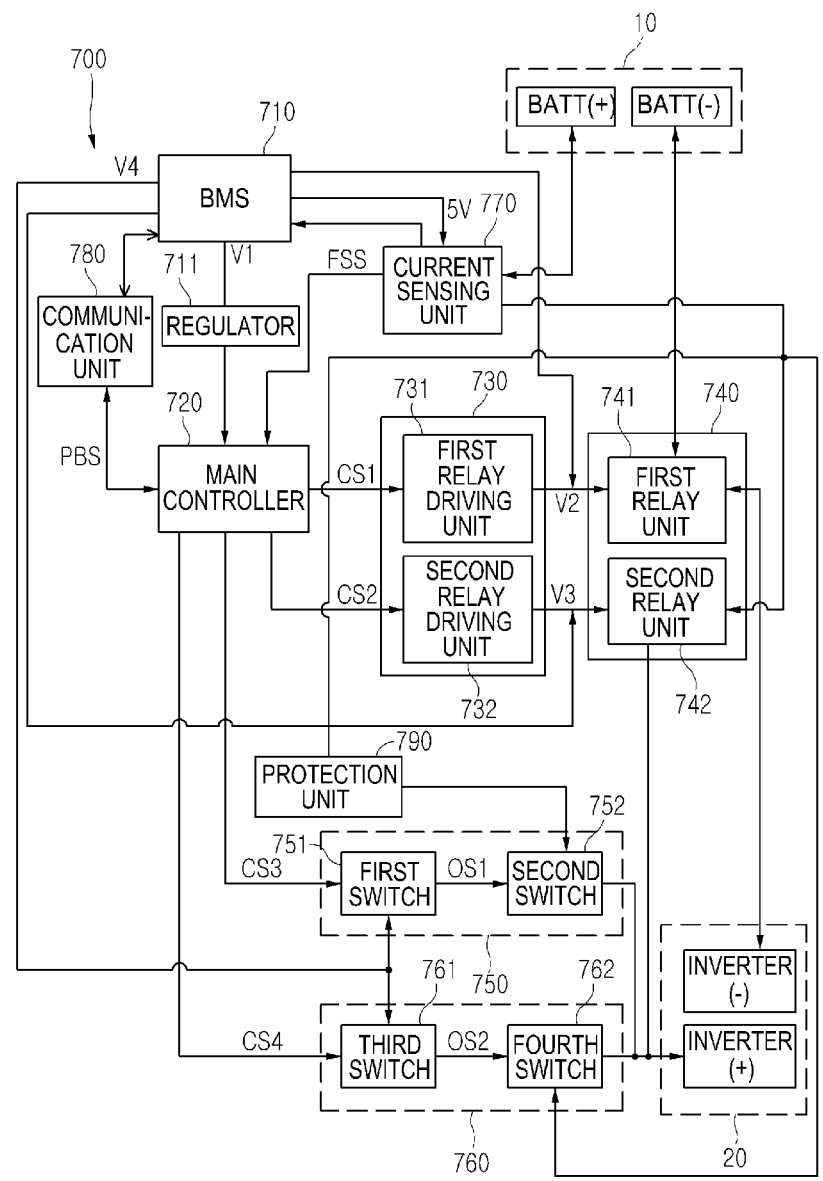
FIG. 14 is a block diagram of a power relay assembly driving apparatus according to a seventh embodiment of the present invention.

FIG. 14 is a block diagram of a power relay assembly driving apparatus according to a seventh embodiment of the present invention.

Referring to FIG. 14, the power relay assembly driving apparatus according to a seventh embodiment of the present invention 700 is connected between a battery unit 10 and an inverter unit 20, and is configured to supply power to the inverter unit 20 from the battery unit 10 or disconnect the power supply.

More specifically, the power relay assembly driving apparatus according to a seventh embodiment of the present invention 700 includes a BMS 710, a regulator 711, a main controller 720, a relay driving unit 730 having a first relay driving unit 731 and a second relay driving unit 732, a relay unit 740 having a first relay unit 741 and a second relay unit 742, a first switching unit 750, a second switching unit 760, a current sensing unit 770, a communication unit 780, and a protection unit 790.

The BMS 710 is electrically-connected to the battery unit 10, thereby maintaining and controlling a state of the battery unit 10. The BMS 710 outputs a first voltage (V1), a second voltage (V2), a third voltage (V3) and a fourth voltage (V4). The first voltage (V1) is a voltage to be converted to a main voltage for driving the main controller 720, and the second voltage (V2) is a voltage for turning on the first relay unit 741. The third voltage (V3) is a voltage for turning on the second relay unit 742, and the fourth voltage (V4) is a voltage for turning on the first switching unit 750 and the second switching unit 760.

The regulator 711 receives the first voltage (V1) from the BMS 710, and converts the received first voltage (V1) into a main voltage. That is, the regulator 711 converts the first voltage (V1) into a main voltage and then outputs the main voltage, so that the main controller 720 can be stably operated.

The main controller 720 is connected to the BMS 710, and is operated by receiving the main voltage from the regulator 711. The main controller 720 outputs a plurality of control signals. For instance, the main controller 720 outputs a first control signal (CS1) to a fourth control signal (CS4) for controlling the first relay unit 741, the first switching unit 750, the second relay unit 742 and the second switching unit 760.

More specifically, the main controller 720 provides a first control signal (CS1) to the first relay driving unit 731, so that the first relay driving unit 731 can be operated. The main controller 720 turns on the first relay unit 741 using the second voltage (V2) output from the BMS 710 by an operation of the second relay driving unit 732, and thus electrically-connects a first terminal of the battery unit 10 and a first terminal of the inverter unit 20 with each other. The main controller 720 provides a third control signal (CS3) to the first switching unit 750 to thus turn on the first switching unit 750 using the fourth voltage (V4) output from the BMS 710 so that a second terminal of the battery unit 10, the main controller 720, the first switching unit 750, and a second terminal of the inverter unit 20 are electrically-connected with each other. As a result, a capacitor (not shown) included in the inverter unit 20 is pre-charged with the power of the battery unit 10.

The main controller 720 provides a second control signal (CS2) to the second relay driving unit 732, so that the second relay driving unit 732 can be operated. The main controller 720 turns on the first relay unit 741 using the third voltage (V3) output from the BMS 710 by an operation of the second relay driving unit 732. And the main controller 720 controls the capacitor (not shown) included in the inverter unit 20 to be normal-charged with the power of the battery unit 10, as the second terminal of the battery unit 10 and the second terminal of the inverter unit 20 are electrically-connected to each other.

The main controller 720 turns off the first switching unit 750 by cutting off the fourth voltage (V4) provided to the first switching unit 750, without outputting a third control single (CS3) so that the second terminal of the battery unit 10, the main controller 720, the first switching unit 750, and the second terminal of the inverter unit 20 are electrically-separated from each other. As a result, the pre-charging of the capacitor (not shown) included in the inverter unit 20 is ended.

The main controller 720 provides a fourth control signal (CS4) to the second switching unit 760 when power supply from the battery unit 10 is cut off, thereby turning on the second switching unit 760 using the fourth voltage (V4) output from the BMS 710. Then, the main controller 720 turns off the second relay unit 742, so that the second terminal of the battery unit 10 and the second terminal of the inverter unit 20 can be electrically-separated from each other. The time of the power cutoff of the battery unit 10 may be a stopped state after a vehicle driving in a normal case, and may be a short-circuited state where an over-current has occurred in an abnormal case.

The main controller 720 may be configured as a microcomputer.

Hereinafter, a control configuration by the main controller 720 will be explained.

The first relay driving unit 731 is connected between the main controller 720 and the first relay unit 741, thereby driving the first relay unit 741 under control of the main controller 720. That is, the first relay driving unit 731 receives the first control signal (CS1) from the main controller 720, and drives the first relay unit 741 using the second voltage (V2) provided from the BMS 710. The first relay driving unit 731 is operated by receiving the first control signal (CS1) from the main controller 720. And, the first relay driving unit 731 may provide the second voltage (V2) to the first relay unit 741 or may cut off the power supply, according to the first control signal (CS1). More specifically, the first relay driving unit 731 is turned on when provided with the first control signal (CS1), thereby driving the first relay unit 741. On the contrary, the first relay driving unit 731 is turned off when not provided with the first control signal (CS1), thereby not driving the first relay unit 741.

The first switching unit 750 is connected between the main controller 720 and the inverter unit 20, and is operated by receiving the third control signal (CS3) from the main controller 720. The first switching unit 750 forms a path to pre-charge the capacitor (not shown) included in the inverter unit 720, using the power of the battery unit 10, together with the first relay unit 741.

The first switching unit 750 may include a first switch 751 and a second switch 752.

The first switch 751 is operated by receiving the third control signal (CS3) from the main controller 720, and outputs a first signal (OS1). That is, the first switch 751 is turned on when provided with the third control signal (CS3), thereby outputting a first signal (OS1). On the other hand, the first switch 751 is turned off when not provided with the third control signal (CS3), thereby not outputting a first signal (OS1). The first switch 751 may be configured as an Insulated Gate Bipolar Transistor (IGBT), a Field Effect Transistor (FET) or a Metal Oxide Semiconductor Field Effect Transistor (MOSFET).

The second switch 752 is operated by receiving the first signal (OS1) from the first switch 751. That is, the second switch 752 is turned on when provided with the first signal (OS1), and is turned off when not provided with the first signal (OS1). The second switch 752 is continuously turned on while receiving the first signal (OS1), thereby pre-charging the capacitor (not shown) included in the inverter unit 20 with the power of the battery unit 10. The second switch 752 may be configured as an Insulated Gate Bipolar Transistor (IGBT), a Field Effect Transistor (FET) or a Metal Oxide Semiconductor Field Effect Transistor (MOSFET).

After the normal-charging is performed as the second relay unit 742 is turned on, the first switching unit 750 is turned off by not receiving the third control signal (CS3) from the main controller 720. As a result, the pre-charging of the capacitor (not shown) included in the inverter unit 20 is ended.

The second relay driving unit 732 is connected between the main controller 720 and the second relay unit 742, thereby driving the second relay unit 742 under control of the main controller 720. That is, the second relay driving unit 732 receives the second control signal (CS2) from the main controller 720, and drives the second relay unit 742 using the third voltage (V3) provided from the BMS 710. The second relay driving unit 732 is operated by receiving the second control signal (CS2) from the main controller 720. And, the second relay driving unit 732 may provide the third voltage (V3) to the second relay unit 742 or may cut off the power supply, according to the second control signal (CS2). More specifically, the second relay driving unit 732 is turned on when provided with the second control signal (CS2), thereby driving the second relay unit 742. On the contrary, the second relay driving unit 732 is turned off when not provided with the second control signal (CS2), thereby not driving the second relay unit 742.

The relay unit 740 is connected between the battery unit 10 and the inverter unit 20. The relay unit 740 forms an equipotential between the battery unit 10 and the inverter unit 20 together with the first switching unit 750, thereby forming a path to pre-charge the capacitor (not shown) included in the inverter unit 20 with the power of the battery unit 10, or forming a path to normal-charge the capacitor with the power of the battery unit 10 after the pre-charging. The relay unit 740 electrically-separates the battery unit 10 from the inverter unit 20. That is, the relay unit 740 electrically-connects or separates the battery unit 10 and the inverter unit 20 to/from each other, sequentially. Such relay unit 740 includes the first relay unit 741 and the second relay unit 742.

The first relay unit 741 switches a connection between the first terminal of the battery unit 10 and the first terminal of the inverter unit 20. The first relay unit 741 receives the second voltage (V2) from the BMS 710, and electrically-connects or separates the first terminal of the battery unit 10 to/from the first terminal of the inverter unit 20 according to whether the first relay driving unit 731 is operated or not. That is, if the first relay driving unit 731 is operated, the first relay unit 741 is turned on by receiving the second voltage (V2) from the BMS 710, thereby electrically-connecting the first terminal of the battery unit 10 with the first terminal of the inverter unit 20 to thus form an equipotential. On the other hand, if the first relay driving unit 731 is not operated, the first relay unit 741 is turned off as the second voltage (V2) from the BMS 710 is cut off, thereby electrically separating the first terminal of the battery unit 10 from the first terminal of the inverter unit 20. The first relay unit 741 may be composed of coils and switches.

The second relay unit 742 switches a connection between the second terminal of the battery unit 10 and the second terminal of the inverter unit 20. The second relay unit 742 receives the third voltage (V3) from the BMS 710, and electrically-connects or separates the second terminal of the battery unit 10 to/from the second terminal of the inverter unit 20 according to whether the second relay driving unit 732 is operated or not. That is, if the second relay driving unit 732 is operated, the second relay unit 742 is turned on by receiving the third voltage (V3) from the BMS 710, thereby electrically-connecting the second terminal of the battery unit 10 with the second terminal of the inverter unit 20 to thus normal-charge the capacitor (not shown) included in the inverter unit 20 with the power of the battery unit 10. On the other hand, if the second relay driving unit 732 is not operated, the second relay unit 742 is turned off as the second voltage (V3) from the BMS 710 is cut off, thereby electrically separating the second terminal of the battery unit 10 from the second terminal of the inverter unit 20. The second relay unit 742 may be composed of coils and switches.

The second switching unit 760 is connected between the main controller 720 and the inverter unit 20. The second switching unit 760 is operated by receiving the fourth control signal (CS4) from the main controller 720. The second switching unit 760 is turned on before the second relay unit 242 is turned off. This is in order to form an equipotential between the second relay unit 742 and the second terminal of the inverter unit 20, at the time when the second relay unit 742 is turned off so as to electrically separate the battery unit 10 and the inverter unit 20 from each other under control of the main controller 720. The equipotential, formed between the second relay unit 742 and the second terminal of the inverter unit 20, prevents occurrence of an arc at a contact when the second relay unit 742 is turned off. As a result, an expensive special gas-charged relay, used to prevent occurrence of an arc at a contact of a relay, can be replaced by a cheap general relay.

The second switching unit 760 is operated by receiving the fourth control signal (CS4) from the main controller 720, even in a case where a power stop signal (PSS) is provided to the main controller 720 through the communication unit 780, or an abnormal signal (FSS) is provided to the main controller 720 through the current sensing unit 770. The power stop signal (PSS) means a command signal for cutting off power supply to the inverter unit 20 from the battery unit 10, in a case where the second switch 752 or the protection unit 790 has broken down. Whether the second switch 752 or the protection unit 790 has broken down may be determined based on a current value measured by the current sensing unit 790. The abnormal signal (FSS) means a command signal for cutting off power supply to the inverter unit 20 from the battery unit 10, in a case where a current value sensed by the current sensing unit 770 between the battery unit 10 and the relay unit 740 is less than or more than a preset value. The current value may be less than a preset value in a case where the first relay driving unit 731, the second relay driving unit 732, the second switch 752, the protection unit 790 or the battery unit 10 has broken down. On the other hand, the current value may be more than a preset value in a case where a short circuit has occurred. The short circuit may generate heat to thus cause contact fusion at a contact of the second relay unit 742.

The second switching unit 760 may include a third switch 761 and a fourth switch 762.

The third switch 761 receives the fourth control signal (CS4) from the main controller 720 to thus output a second signal (OS2), if it is determined that the main controller 720 has turned off the second relay unit 742 in order to electrically separate the battery unit 10 and the inverter unit 20 from each other, or in a case where the power stop signal (PSS) is provided to the main controller 720 from the BMS 710 through the communication unit 780, or in a case where the abnormal signal (FSS) is provided to the main controller 720. That is, the third switch 761 is turned on to thus output a second signal (OS2) when provided with the fourth control signal (CS4). On the other hand, the third switch 761 is turned off not to thus output the second signal (OS2) when not provided with the fourth control signal (CS4). The third switch 761 may be configured as an Insulated Gate Bipolar Transistor (IGBT), a Field Effect Transistor (FET) or a Metal Oxide Semiconductor Field Effect Transistor (MOSFET).

The fourth switch 762 is operated by receiving the second signal (OS2) from the third switch 761. That is, the fourth switch 762 is turned on when provided with the second signal (OS2), whereas the fourth switch 762 is turned off when not provided with the second signal (OS2). The fourth switch 762 may be configured as an Insulated Gate Bipolar Transistor (IGBT), a Field Effect Transistor (FET) or a Metal Oxide Semiconductor Field Effect Transistor (MOSFET).

The current sensing unit 770 is connected between the relay unit 740 (more specifically, the second relay unit 742) and the battery unit 10, thereby sensing a current. The current sensing unit 770 outputs an abnormal signal (FSS) when a current value is less than or more than a preset value. The current sensing unit 770 may sense a current which flows in the relay unit 740. Then, the current sensing unit 770 may output an abnormal signal (FSS) to the main controller 720 when the sensed current value is less than or more than a preset value.

The communication unit 780 performs communication using one of HS-CAN (High Speed-Controller Area Network), LS-CAN (Low Speed-Controller Area Network) and LIN (Local Interconnect Network). The communication unit 780 can easily control the main controller 720 using a communication scheme of HS-CAN, LS-CAN and LIN.

In FIG. 14, the regulator 711 and the communication unit 780 are arranged in a separated manner. However, the present invention is not limited to this, but the regulator 711 may accommodate the communication unit 780 therein. That is, the communication unit 780 may be accommodated in the regulator 711 to thus be configured as a single chip. Accordingly, the communication unit 780 can control the main controller 720 using a communication scheme of HS-CAN, LS-CAN and LIN.

The protection unit 790 is connected between the first switching unit 750 and the relay unit 740, more specifically, between the second switch 752 and the current sensing unit 770, and controls a current flow according to a sensed temperature. The protection unit 790 may be configured as a Positive Thermal Coefficient (PTC) thermistor. The PTC thermistor can cut off a current flow by increasing its resistance when its temperature increases. The protection unit 790 is connected between the second switch 752 and the relay unit 740, thereby preventing damage of the second switch 752 due to temperature increase.

In the power relay assembly driving apparatus 700 according to a seventh embodiment of the present invention, the second switching unit 760 is turned on before the second relay unit 742 is turned off under control of the main controller 720. As a result, an equipotential can be formed between the second relay unit 742 and the second terminal of the inverter unit 20 when the second relay unit 742 is turned off in order to electrically-separate the second terminal of the battery unit 10 and the second terminal of the inverter unit 20 from each other. Due to the equipotential formed between the second relay unit 742 and the second terminal of the inverter unit 20, occurrence of an arc at a contact when the second relay unit 742 is turned off can be prevented. As a result, an expensive special gas-charged relay, used to prevent occurrence of an arc at a contact of a relay, can be replaced by a cheap general relay. Further, fuel efficiency of a vehicle can be enhanced by having a reduced entire weight due to the general relay.

In a case where a power stop signal (PSS) is provided to the main controller 720 through the communication unit 780, or an abnormal signal (FSS) is provided to the main controller 720 through the current sensing unit 770, the second switching unit 760 is turned on and the second relay unit 742 is turned off. Accordingly, a user can handle a case where the second switch 752 or the protection unit 790 has broken down, or a case where an over-current flows. Further, contact fusion, which occurs at a contact of the second relay unit 742 when a short circuit has occurred, can be prevented.

In the power relay assembly driving apparatus 700 according to a seventh embodiment of the present invention, arrangement of wires can be simplified by preventing increment of the wires due to addition of peripheral devices using the communication unit 780.

Further, an error resulting from mal-connection of complicated wires can be minimized by easily controlling the main controller 720 without the complicated wires.

Further, in the power relay assembly driving apparatus 700 according to a seventh embodiment of the present invention, damage of the second switch 752 due to temperature increase can be prevented by controlling a current flow according to a temperature sensed by the protection unit 790 connected between the first switching unit 750 and the relay unit 740.

Hereinafter, a method for driving the power relay assembly driving apparatus according to a seventh embodiment of the present invention will be explained with reference to FIG. 14.

Figures 15, 16:
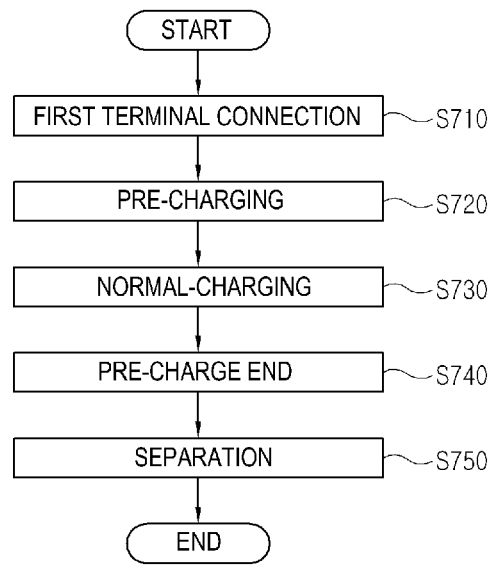
FIG. 15 is a flowchart showing a driving method by a power relay assembly driving apparatus according to a seventh embodiment of the present invention.
FIG. 16 is a view for explaining an operation of some components in the form of a table in a driving method by a power relay assembly driving apparatus according to a seventh embodiment of the present invention.

FIG. 15 is a flowchart showing a driving method by a power relay assembly driving apparatus according to a seventh embodiment of the present invention, and FIG. 16 is a view for explaining an operation of some components in the form of a table in a driving method by a power relay assembly driving apparatus according to a seventh embodiment of the present invention.

Referring to FIG. 15, the method for driving a power relay assembly driving apparatus according to a seventh embodiment of the present invention includes a first terminal connection step (S710), a pre-charging step (S720), a normal-charging step (S730), a pre-charge end step (S740) and a separation step (S750). In the method for driving a power relay assembly driving apparatus according to a seventh embodiment of the present invention, power is supplied to the inverter unit 20 from the battery unit 10, or the power supply is cut off.

It is assumed that the power relay assembly driving apparatus 700 according to a seventh embodiment of the present invention is in an 'OFF' state.

In the first terminal connection step (S710), the main controller 720 controls the first relay unit 741. That is, as shown in FIG. 16, the first relay unit 741 is turned on by the main controller 720, so that the first terminal of the battery unit 10 and the first terminal of the inverter unit 20 can be electrically-connected to each other.

More specifically, in the first terminal connection step (S710), the regulator 711 receives a first voltage (V1) from the BMS 710, and converts the first voltage (V1) into a main voltage. Then, the regulator 711 provides the main voltage to the main controller 720, so that the main controller 720 is operated. The main controller 720 provides a first control signal (CS1) to the first relay driving unit 731, so that the first relay driving unit 731 is operated. The first relay driving unit 731 provides a second voltage (V2) provided from the BMS 710, to the first relay unit 741. As a result, the first relay unit 741 is turned on, and the first terminal of the inverter unit 20 and the first terminal of the battery unit 10 are electrically-connected to each other.

In the pre-charging step (S720), the main controller 720 controls the first switching unit 750 after the first terminal connection step (S710). More specifically, as shown in FIG. 16, the first driving unit 750 is turned on to electrically-connect the second terminal of the battery unit 10, the main controller 720, the first switching unit 750, and the second terminal of the inverter unit 20 to one another, thereby pre-charging a capacitor (not shown) included in the inverter unit 20 with the power of the battery unit 10. The pre-charging may be performed so that the capacitor (not shown) included in the inverter unit 20 can be charged about 80%~85% of capacitance of the capacitor for a preset time (e.g., first time).

More specifically, in the pre-charging step (S720), the first switch 751 is operated by receiving a third control signal (CS3) from the main controller 720. The first switch 751 is turned on upon receipt of the third control signal (CS3), thereby outputting a first signal (OS1). The second switch 752 is turned on by receiving the first signal (OS1) from the first switch 751, thereby pre-charging the capacitor (not shown) included in the inverter unit 20. The second switch 752 can maintain the 'ON' state while the capacitor (not shown) included in the inverter unit 20 is pre-charged.

In the normal-charging step (S730), the main controller 720 controls the second relay unit 742 after the pre-charging (S720). That is, as shown in FIG. 16, the main controller 720 turns on the second relay unit 742 so as to electrically-connect the second terminal of the battery unit 10 with the second terminal of the inverter unit 20 through the second relay unit 742, thereby normal-charging the capacitor (not shown) included in the inverter unit 20 with the power of the battery unit 10. The normal-charging may be performed so that the capacitor (not shown) included in the inverter unit 20 can be charged about 100% of capacitance of the capacitor for a preset time (e.g., second time).

More specifically, in the normal-charging step (S730), the main controller 720 provides a second control signal (CS2) to the second relay driving unit 732. As the second relay driving unit 732 is operated, the second terminal of the battery unit 10 and the second terminal of the inverter unit 20 are electrically-connected to each other. As a result, the capacitor (not shown) included in the inverter unit 20 is normal-charged.

Although not shown, in a case where the first switching unit 750 is turned on, the protection unit 790 connected between the first switching unit 750 and the current sensing unit 770 can control a current flow according to a temperature.

In the pre-charge end step (S740), the main controller 720 controls the first switching unit 750. That is, as shown in FIG. 16, the main controller 720 turns off the first switching unit 750, thereby ending the pre-charging of the capacitor (not shown) included in the inverter unit 20. The pre-charge end step (S740) is performed during the normal-charging step (S730) before the inverter unit 20 is operated.

More specifically, in the pre-charge end step (S740), the main controller 720 cuts off the third control signal (CS3) provided to the first switch 751. The first switch 751 is turned off when not provided with the third control signal (CS3), thereby not outputting the first signal (OS1). Accordingly, the first signal (OS1) supplied from the first switch 151 is cut off, and thus the second switch 752 is turned off.

In the separation step (S750), the main controller 720 controls the second switching unit 760 when power supply from the battery unit 10 is cut off during the normal-charging step (S730). That is, the main controller 720 turns on the second switching unit 760, in order to form an equipotential between the second relay unit 742 and the second terminal of the inverter unit 20. Then, the main controller 720 turns off the second relay unit 742 so that the second terminal of the battery unit 10 and the second terminal of the inverter unit 20 can be electrically-separated from each other. The time of the power cutoff of the battery unit 10 may be a stopped state after a vehicle driving in a normal case, and may be a short-circuited state where an over-current has occurred in an abnormal case.

More specifically, in the separation step (S750), the third switch 761 is operated by receiving a fourth control signal (CS4) from the main controller 720. The third switch 761 is turned on when provided with the fourth control signal (CS4), thereby outputting a second signal (OS2). If the fourth switch 762 is turned on by receiving the second signal (OS2) from the third switch 761, an equipotential is formed between the second relay unit 742 and the second terminal of the inverter unit 20. Under such configuration, even if the second relay unit 742 is turned off, an arc does not occur at a contact of the second relay unit 742.

The separation step (S750) may be immediately performed in a case where a power stop signal (PSS) is provided to the main controller 720 from the BMS 710 through the communication unit 780, or an abnormal signal (FSS) is provided to the main controller 720 through the current sensing unit 770. That is, the second switching unit 760 may be turned on under control of the main controller 720, in a case where the communication unit 780 provides a power stop signal (PSS) from the BMS 710 to the main controller 720. Alternatively, the second switching unit 760 may be turned on under control of the main controller 720, in a case where an abnormal signal is provided to the BMS 710 and the main controller 720 when a current value sensed by the current sensing unit 770 is less than or more than a preset value.

Although not shown, in the separation step (S750), the main controller 720 cuts off the second control signal (CS2) after the second switching unit 760 is turned on. As a result, the second relay driving unit 732 is turned off, and the second relay unit 742 is turned off. Accordingly, the second terminal of the battery unit 10 and the second terminal of the inverter unit 20 are electrically separated from each other.

In the separation step (S750), the main controller 720 cuts off the fourth control signal (CS4) being supplied to the third switch 761 after the second relay unit 742 is turned off. As the fourth control signal (CS4) is cut off, the third switch 761 is turned off and thus the second signal (OS2) is not output. As a result, the fourth switch 762 is turned off because it is not provided with the second signal (OS2) from the third switch 761.

In the separation step (S750), the main controller 720 cuts off the first control signal (CS1) being supplied to the first relay driving unit 731 after the fourth switch 762 is turned off. As a result, the first relay driving unit 731 is turned off, and the first relay unit 741 is not operated. Accordingly, the first terminal of the battery unit 10 and the first terminal of the inverter unit 20 are electrically separated from each other.

INDUSTRIAL APPLICABILITY

The power relay assembly driving apparatus and the driving method thereof according to the present invention can be used as a power disconnecting apparatus in electric vehicles, hybrid vehicles, etc.

The invention claimed is:

1. A power relay assembly driving apparatus, comprising:
a first relay unit which switches a connection between a first terminal of a battery unit and a first terminal of an inverter unit having a capacitor;
a second relay unit which switches a connection between a second terminal of the battery unit and a second terminal of the inverter unit;
a first switching unit connected in parallel to the second relay unit between the second terminal of the battery unit and the second terminal of the inverter unit;
a second switching unit connected in parallel to the second relay unit between the second terminal of the battery unit and the second terminal of the inverter unit; and
a battery management system which controls the first relay unit and the first switching unit in order to pre-charge the capacitor with the power of the battery unit, controls the second relay unit in order to normal-charge the capacitor with the power of the battery unit and then controls the first switching unit in order to end the pre-charging of the capacitor, controls the second switching unit upon a power cutoff of the battery unit in order to form an equipotential between the second relay unit and the second terminal of the inverter unit, and controls the second relay unit in order to electrically separate the second terminal of the battery unit and the second terminal of the inverter unit from each other.

2. The apparatus of claim 1, wherein the battery management system electrically-separates the second terminal of the battery unit and the second terminal of the inverter unit from each other, by cutting off power supply to the second relay unit, and then by turning on the second switching unit before the second relay unit is completely turned off.

3. The apparatus of claim 1, wherein the battery management system electrically-separates the second terminal of the battery unit and the second terminal of the inverter unit from each other, by turning on the second switching unit, and then by cutting off power supply to the second relay unit.

4. The apparatus of claim 1, wherein the battery management system outputs a first voltage, a second voltage and a third voltage, and
wherein the first relay unit is operated by receiving the second voltage.

5. The apparatus of claim 4, further comprising:
a first driving unit connected between the second terminal of the battery unit and the first switching unit, operated by receiving the first voltage, and providing a first signal to the first switching unit;
a sensing unit connected between the second relay unit and the second switching unit, and configured to sense the third voltage provided to the second relay unit;
a comparison unit connected between the sensing unit and the second switching unit, and configured to output a high signal when the third voltage is cut off; and
a second driving unit connected among the second terminal of the battery unit, the comparison unit and the second switching unit, operated by receiving the high signal, and providing a second signal to the second switching unit.

6. The apparatus of claim 4, wherein the battery management system further outputs a fourth voltage, and
wherein the apparatus further comprises:
a first driving unit connected among the second terminal of the battery unit, the battery management system and the first switching unit, operated by receiving the first voltage, and providing a first signal to the first switching unit;
a voltage distribution unit connected between the battery management system and the second switching unit, and receiving the fourth voltage from the battery management system before the third voltage provided to the second relay unit is cut off by the battery management system; and
a second driving unit connected between the voltage distribution unit and the second switching unit, operated by receiving a distribution voltage diverged from the fourth voltage, and providing a second signal to the second switching unit.

7. The apparatus of claim 4, wherein the battery management system further outputs a fourth voltage, and
wherein the apparatus further comprises:
a first driving unit connected between the second terminal of the battery unit and the first switching unit, operated by receiving the first voltage, and providing a first signal to the first switching unit;
a sensing unit connected between the second relay unit and the second switching unit, and configured to sense the third voltage provided to the second relay unit;
a comparison unit connected between the second relay unit and the sensing unit, and configured to output a high signal when the third voltage is cut off;
a voltage distribution unit connected between the battery management system and the second switching unit, and receiving the fourth voltage from the battery management system; and
a second driving unit connected between the voltage distribution unit and the second switching unit, operated by receiving a distribution voltage diverged from one of the fourth voltage and the high-signal voltage, and providing a second signal to the second switching unit.

8. A power relay assembly driving apparatus, comprising:
a first relay unit which switches a connection between a first terminal of a battery unit and a first terminal of an inverter unit having a capacitor;
a second relay unit which switches a connection between a second terminal of the battery unit and a second terminal of the inverter unit;
a first switching unit and a second switching unit connected between a main controller connected to the second terminal of the battery unit and the second terminal of the inverter unit; and
the main controller which controls the first relay unit and the first switching unit in order to pre-charge the capacitor with the power of the battery unit, controls the second relay unit in order to normal-charge the capacitor with the power of the battery unit, controls the first switching unit in order to end the pre-charging of the capacitor, controls the second switching unit upon a power cutoff of the battery unit in order to form an equipotential between the second relay unit and the second terminal of the inverter unit, and controls the second relay unit in order to electrically separate the second terminal of the battery unit and the second terminal of the inverter unit from each other.

9. The apparatus of claim 8, wherein the main controller turns on the second switching unit and then turns off the second relay unit, in order to electrically-separate the second terminal of the battery unit and the second terminal of the inverter unit.

10. The apparatus of claim 8, further comprising a battery management system connected to the battery unit, configured to maintain and manage a state of the battery unit, and configured to output a first voltage, a second voltage, a third voltage and a fourth voltage, and
wherein the main controller is operated by receiving a main voltage converted from the first voltage, and outputs a first control signal, a second control signal, a third control signal and a fourth control signal.

11. The apparatus of claim 10, further comprising:
a first relay driving unit connected between the main controller and the first relay unit, and configured to drive the first relay unit using the second voltage by the first control signal; and
a second relay driving unit connected between the main controller and the second relay unit, and configured to drive the second relay unit using the third voltage by the second control signal.

12. The apparatus of claim 10, wherein the first switching unit includes a first switch driven by the fourth voltage by the third control signal, and a second switch driven by a first signal output from the first switch; and
wherein the second switching unit includes a third switch driven by the fourth voltage by the fourth control signal, and a fourth switch driven by a second signal output from the third switch.

13. The apparatus of claim 10, further comprising a current sensing unit connected between the second relay unit and the battery unit, configured to sense a current, and configured to output an abnormal signal when a current value is less than or more than a preset value, and
wherein the main controller turns on the second switching unit and then turns off the second relay unit when provided with the abnormal signal from the current sensing unit.

14. The apparatus of claim 10, further comprising a communication unit connected between the battery management system and the main controller, and configured to enable communication between the battery management system and the main controller, and
wherein the main controller turns on the second switching unit and then turns off the second relay unit when provided with a power stop signal from the battery management system through the communication unit.

15. A method for driving a power relay assembly driving apparatus, the method comprising:
a first terminal connection step of controlling a first relay unit by a main controller in order to electrically-connect a first terminal of a battery unit to a first terminal of an inverter unit having a capacitor;
a pre-charging step of controlling the first switching unit by the main controller after the first terminal connection step, in order to electrically-connect a second terminal of the battery unit with a second terminal of the inverter unit, thereby pre-charging the capacitor with a power of the battery unit;
a normal-charging step of controlling a second relay unit by the main controller after the pre-charging step, in order to electrically-connect the second terminal of the battery unit, the second relay unit and the second terminal of the inverter unit with one another, thereby normal-charging the capacitor with the power of the battery unit;
a pre-charge end step of controlling the first switching unit by the main controller during the normal-charging step, thereby electrically separating the second terminal of the battery unit and the second terminal of the inverter unit from each other; and
a separation step of controlling a second switching unit by the main controller upon a power cutoff of the battery unit during the normal-charging step, in order to form an equipotential between the second relay unit and the second terminal of the inverter unit, and then controlling the second relay unit in order to electrically separate the second terminal of the battery unit and the second terminal of the inverter unit from each other.

16. The method of claim 15, wherein a battery management system configured to maintain and manage a state of the battery unit and to output a first voltage, a second voltage, a third voltage and a fourth voltage is connected to the battery unit,
wherein a first relay driving unit is connected between the main controller and the first relay unit;
wherein a second relay driving unit is connected between the main controller and the second relay unit; and
wherein the main controller is operated by receiving a main voltage converted from the first voltage, and outputs a first control signal, a second control signal, a third control signal and a fourth control signal.

17. The method of claim 16, wherein in the separation step, the main controller turns on the second switching unit using the fourth voltage by providing the fourth control signal to the second switching unit, and turns off the second relay unit by cutting off the third voltage provided to the second relay unit by not providing the second control signal to the second relay driving unit.

18. The method of claim 16, wherein the separation step is performed in a case where a current sensing unit, connected between the second relay unit and the battery unit and configured to sense a current, provides an abnormal signal to the battery management system and the main controller, when a measured current value is less than or more than a preset value.

19. The method of claim 16, wherein the separation step is performed in a case where a communication unit connected between the battery management system and the main controller provides a power stop signal to the main controller from the battery management system.

20. The method of claim 19, wherein in a case where the first switching unit is turned on, a protection unit connected between the first switching unit and the current sensing unit controls a current flow according to a temperature.

* * * * *